US012628128B2

(12) United States Patent
Dong et al.

(10) Patent No.: US 12,628,128 B2
(45) Date of Patent: May 12, 2026

(54) COMMUNICATION METHOD AND COMMUNICATION APPARATUS

(71) Applicant: HUAWEI TECHNOLOGIES CO., LTD., Shenzhen (CN)

(72) Inventors: Lei Dong, Shanghai (CN); Hongjia Su, Shanghai (CN); Wenting Guo, Shenzhen (CN); Chang He, Shanghai (CN); Lei Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 384 days.

(21) Appl. No.: 18/299,945

(22) Filed: Apr. 13, 2023

(65) Prior Publication Data

US 2023/0247589 A1      Aug. 3, 2023

Related U.S. Application Data

(63) Continuation of application No. PCT/CN2020/121555, filed on Oct. 16, 2020.

(51) Int. Cl.
| | |
|---|---|
| *H04W 72/02* | (2009.01) |
| *H04W 24/10* | (2009.01) |
| *H04W 72/25* | (2023.01) |

(52) U.S. Cl.
CPC ........... *H04W 72/02* (2013.01); *H04W 24/10* (2013.01); *H04W 72/25* (2023.01)

(58) Field of Classification Search
CPC ..... H04W 24/10; H04W 72/02; H04W 72/25; H04W 92/18
See application file for complete search history.

(56) References Cited

U.S. PATENT DOCUMENTS

| 10,462,802 B2 * | 10/2019 | Marinier | H04W 72/04 |
|---|---|---|---|
| 10,536,826 B2 * | 1/2020 | Lee | H04W 72/0446 |

(Continued)

FOREIGN PATENT DOCUMENTS

| CA | 3163546 A1 * | 5/2021 | H04W 76/28 |
|---|---|---|---|
| CN | 110167072 B * | 5/2022 | H04W 72/20 |

(Continued)

OTHER PUBLICATIONS

3GPP 38.213 V16.0.0:"3rd Generation Partnership Project; Technical Specification Group Radio Access Network; NR; Physical layer procedures for control (Release 16)",Dec. 2019,total 146 pages.

(Continued)

*Primary Examiner* — Eric Nowlin
(74) *Attorney, Agent, or Firm* — HAUPTMAN HAM, LLP

(57) ABSTRACT

A communication method includes receiving coordination information. The coordination information is used by a first sidelink device to determine a first resource set. The first resource set is used by the first sidelink device to send information. The communication method also includes determining that the coordination information includes one or more of information about a second resource set recommended to the first sidelink device, information about a third resource set scheduled to the first sidelink device, information about a fourth resource set expected to be excluded by the first sidelink device, a coordination parameter or a measurement result, where the coordination parameter or the measurement result is used by the first sidelink device to determine the first resource set, or indication information, where the indication information instructs the first sidelink device to determine the first resource set.

16 Claims, 8 Drawing Sheets

(56) References Cited

U.S. PATENT DOCUMENTS

| | | | | |
|---|---|---|---|---|
| 10,660,021 | B2 * | 5/2020 | Jung | H04W 24/10 |
| 10,694,347 | B2 * | 6/2020 | Lee | H04W 4/40 |
| 10,757,550 | B2 * | 8/2020 | Lee | H04W 72/543 |
| 10,785,618 | B2 * | 9/2020 | Lee | H04W 4/40 |
| 10,805,776 | B2 * | 10/2020 | Lee | H04W 4/40 |
| 10,993,092 | B2 * | 4/2021 | Lee | H04W 4/40 |
| 10,993,095 | B2 * | 4/2021 | Lee | H04W 4/40 |
| 11,147,044 | B2 * | 10/2021 | Lee | H04W 72/02 |
| 11,240,646 | B2 * | 2/2022 | Lee | H04W 4/40 |
| 11,240,783 | B2 * | 2/2022 | Lee | H04W 52/346 |
| 11,246,114 | B2 * | 2/2022 | Khoryaev | H04W 4/40 |
| 11,277,849 | B2 * | 3/2022 | Marinier | H04W 72/02 |
| 11,317,382 | B2 * | 4/2022 | Lee | H04W 4/40 |
| 11,343,662 | B2 * | 5/2022 | Tang | H04B 17/318 |
| 11,425,690 | B2 * | 8/2022 | Manolakos | H04W 72/046 |
| 11,432,263 | B2 * | 8/2022 | Lee | H04W 4/40 |
| 11,695,516 | B2 * | 7/2023 | Huang | H04L 1/1864 |
| | | | | 370/312 |
| 11,979,855 | B2 * | 5/2024 | Cai | H04W 72/56 |
| 11,979,869 | B2 * | 5/2024 | Marinier | H04W 72/04 |
| 12,058,645 | B2 * | 8/2024 | Lee | H04W 28/0289 |
| 12,219,640 | B2 * | 2/2025 | Wu | H04W 76/14 |
| 12,328,773 | B2 * | 6/2025 | Liu | H04L 5/0012 |
| 12,335,989 | B2 * | 6/2025 | Ibrahim | H04B 7/06952 |
| 12,369,222 | B2 * | 7/2025 | Wang | H04W 56/001 |
| 12,402,161 | B2 * | 8/2025 | Ye | H04W 72/02 |
| 2016/0183276 | A1 * | 6/2016 | Marinier | H04W 72/04 |
| | | | | 370/329 |
| 2017/0188391 | A1 * | 6/2017 | Rajagopal | H04W 74/0816 |
| 2018/0098323 | A1 * | 4/2018 | Zhang | H04L 5/00 |
| 2019/0075548 | A1 * | 3/2019 | Lee | H04W 4/40 |
| 2019/0090450 | A1 * | 3/2019 | Lee | H04W 72/0446 |
| 2019/0110177 | A1 * | 4/2019 | Lee | H04W 72/02 |
| 2019/0191461 | A1 * | 6/2019 | Lee | H04W 4/40 |
| 2019/0222980 | A1 * | 7/2019 | Lee | H04W 72/541 |
| 2019/0222981 | A1 * | 7/2019 | Lee | H04W 4/40 |
| 2019/0246249 | A1 * | 8/2019 | Lee | H04W 4/40 |
| 2019/0313374 | A1 * | 10/2019 | Lee | H04W 4/40 |
| 2020/0015241 | A1 * | 1/2020 | Marinier | H04W 72/04 |
| 2020/0029245 | A1 * | 1/2020 | Khoryaev | H04W 36/22 |
| 2020/0204968 | A1 * | 6/2020 | Lee | H04W 4/40 |
| 2020/0236518 | A1 * | 7/2020 | Lee | H04W 4/40 |
| 2020/0260246 | A1 * | 8/2020 | Tang | H04W 4/70 |
| 2020/0280961 | A1 * | 9/2020 | Lee | H04W 4/40 |
| 2020/0296690 | A1 * | 9/2020 | Lee | H04W 4/40 |
| 2020/0296691 | A1 * | 9/2020 | Lee | H04W 52/383 |
| 2020/0296692 | A1 * | 9/2020 | Lee | H04W 52/383 |
| 2021/0045088 | A1 * | 2/2021 | Cai | H04W 72/20 |
| 2021/0075552 | A1 * | 3/2021 | Huang | H04L 1/1854 |
| 2021/0160817 | A1 * | 5/2021 | Khoryaev | H04W 72/542 |
| 2021/0219314 | A1 * | 7/2021 | Osawa | H04W 76/14 |
| 2021/0289475 | A1 * | 9/2021 | S Reddy | H04L 5/0066 |
| 2022/0217730 | A1 * | 7/2022 | Marinier | H04W 72/02 |
| 2022/0303956 | A1 * | 9/2022 | Hong | H04W 4/40 |
| 2022/0322359 | A1 * | 10/2022 | Ye | H04W 72/563 |
| 2022/0322360 | A1 * | 10/2022 | Ye | H04W 76/14 |
| 2023/0131353 | A1 * | 4/2023 | Miao | H04W 72/40 |
| | | | | 370/329 |
| 2023/0156776 | A1 * | 5/2023 | Kupanna Subramani | |
| | | | | H04W 4/46 |
| | | | | 370/329 |
| 2023/0239900 | A1 * | 7/2023 | Park | H04W 36/06 |
| | | | | 370/329 |
| 2023/0247589 | A1 * | 8/2023 | Dong | H04W 72/25 |
| | | | | 370/329 |
| 2023/0247717 | A1 * | 8/2023 | Wang | H04W 76/14 |
| | | | | 370/329 |
| 2023/0254816 | A1 * | 8/2023 | Dutta | H04L 5/0053 |
| | | | | 370/329 |
| 2023/0254817 | A1 * | 8/2023 | Zhao | H04B 17/328 |
| | | | | 370/329 |
| 2023/0262665 | A1 * | 8/2023 | Zhao | H04W 72/044 |
| | | | | 370/330 |
| 2023/0262737 | A1 * | 8/2023 | Wang | H04W 72/25 |
| | | | | 370/329 |
| 2023/0262774 | A1 * | 8/2023 | Wu | H04W 28/0284 |
| | | | | 370/329 |
| 2023/0403730 | A1 * | 12/2023 | Shen | H04W 72/25 |
| 2024/0030992 | A1 * | 1/2024 | Guo | H04B 7/06954 |
| 2024/0292405 | A1 * | 8/2024 | Wang | H04W 72/121 |
| 2024/0298313 | A1 * | 9/2024 | Marinier | H04W 72/04 |
| 2024/0389142 | A1 * | 11/2024 | Guo | H04W 74/0808 |

FOREIGN PATENT DOCUMENTS

| | | | | | |
|---|---|---|---|---|---|
| CN | 114867062 | A * | 8/2022 | | H04W 72/56 |
| CN | 115915401 | A * | 4/2023 | | H04W 72/02 |
| CN | 116472771 | A * | 7/2023 | | H04L 1/004 |
| CN | 121038017 | A * | 11/2025 | | H04W 24/10 |
| EP | 3432657 | A1 * | 1/2019 | | H04W 72/543 |
| EP | 3672133 | A1 * | 6/2020 | | H04W 72/23 |
| EP | 3672338 | A1 * | 6/2020 | | H04W 72/543 |
| EP | 3745768 | A1 * | 12/2020 | | H04W 72/56 |
| EP | 3790214 | A1 * | 3/2021 | | H04W 72/20 |
| EP | 3432657 | B1 * | 10/2021 | | H04W 72/543 |
| EP | 3923647 | A1 * | 12/2021 | | H04W 72/543 |
| EP | 3672133 | B1 * | 9/2022 | | H04W 72/56 |
| EP | 3672338 | B1 * | 11/2022 | | H04W 72/56 |
| EP | 3790214 | B1 * | 2/2023 | | H04L 1/1861 |
| EP | 3923647 | B1 * | 2/2023 | | H04W 92/18 |
| EP | 4224956 | A1 * | 8/2023 | | H04L 1/004 |
| EP | 4236393 | A1 * | 8/2023 | | H04W 72/25 |
| EP | 3745768 | B1 * | 11/2023 | | H04W 4/40 |
| EP | 4626068 | A2 * | 10/2025 | | H04W 24/10 |
| JP | 2021513290 | A * | 5/2021 | | H04W 72/53 |
| JP | 2023513443 | A * | 3/2023 | | H04W 76/28 |
| JP | 7294573 | B2 * | 6/2023 | | H04W 4/40 |
| KR | 20200116515 | A * | 10/2020 | | H04W 72/53 |
| KR | 20220150989 | A * | 11/2022 | | H04W 72/56 |
| KR | 20230014765 | A * | 1/2023 | | H04W 92/18 |
| KR | 102624306 | B1 * | 1/2024 | | H04W 4/40 |
| WO | 2017027355 | A1 | 2/2017 | | |
| WO | 2017166389 | A1 | 10/2017 | | |
| WO | 2018233566 | A1 | 12/2018 | | |
| WO | 2019195138 | A1 | 10/2019 | | |
| WO | WO-2019234901 | A1 * | 12/2019 | | H04W 72/52 |
| WO | 2020198760 | A2 | 10/2020 | | |
| WO | WO-2022071721 | A1 * | 4/2022 | | H04L 1/004 |
| WO | WO-2022083766 | A1 * | 4/2022 | | H04W 72/569 |
| WO | WO-2023146672 | A1 * | 8/2023 | | H04W 92/18 |

OTHER PUBLICATIONS

3GPP 38.331 V15.7.0:"3rd Generation Partnership Project; Technical Specification Group Radio Access Network; NR; Radio Resource Control (RRC) protocol specification (Release 15)".Sep. 2019,total 527 pages.

3GPP TS 38.321 V16.2.1:"3rd Generation Partnership Project; Technical Specification Group Radio Access Network; NR;Medium Access Control (MAC) protocol specification(Release 16)",Sep. 2020,total 154 pages.

3GPP TS 38.214 V16.3.0:"3rd Generation Partnership Project;Technical Specification Group Radio Access Network; NR;Physical layer procedures for data(Release 16)",Sep. 2020,total 166 pages.

3GPP TS 38.212 V16.3.0:"3rd Generation Partnership Project;Technical Specification Group Radio Access Network; NR;Multiplexing and channel coding(Release 16)".Sep. 2020,total 152 pages.

3GPP TS 38.211 V16.3.0 (Sep. 2020), 3rd Generation Partnership Project; Technical Specification Group Radio Access Network; NR; Physical channels and modulation(Release 16), 133 pages.

International Search Report issued in corresponding International Application No. PCT/CN2020/121555, dated Jul. 6, 2021, pp. 1-10.

Spreadtrum Communications, Discussion on feasibility and benefit of mode 2 enhancements. 3GPP TSG RAN WG1 #102-e, e-Meeting, Aug. 17-28, 2020, R1-2006268, 4 pages.

(56)  References Cited

OTHER PUBLICATIONS

Partial Supplementary European Search Report issued in corresponding European Application No. 20957231.2, dated Oct. 23, 2023, pp. 1-9.

\* cited by examiner

Network
device 104

Terminal
device 103

Terminal
device 101

Terminal
device 102

V2V

| First sidelink device | | Second sidelink device |

1301: First indication information and trigger information

1302: Determine content of the trigger information based on the first indication information Antenna Radio frequency circuit — 1401

Memory ⟷ Processor — 1402

Input/Output apparatus

COMMUNICATION METHOD AND COMMUNICATION APPARATUS

CROSS-REFERENCE TO RELATED APPLICATIONS

This application is a continuation of International Application No. PCT/CN2020/121555, filed on Oct. 16, 2020, the disclosure of which is hereby incorporated by reference in its entirety.

TECHNICAL FIELD

This application relates to the field of communication technologies, and in particular, to a communication method and a communication apparatus.

BACKGROUND

An internet of vehicles technology for vehicle-to-everything (V2X) communication is proposed. The V2X communication refers to communication between a vehicle and anything outside, including vehicle-to-vehicle (V2V) communication, vehicle-to-pedestrian (V2P) communication, vehicle-to-infrastructure (V2I) communication, and vehicle-to-network (V2N) communication. In an internet of vehicles system, when terminal devices communicate with each other, two resource allocation modes are usually used. One is that a network device schedules a sidelink transmission resource, and the other is that the terminal device autonomously selects a resource. In the autonomous resource selection mode, a transmission resource of a sending terminal device does not depend on a base station.

In the autonomous resource selection mode, the sending terminal and a coordinating terminal need to coordinate with each other. However, there is no effective solution currently. The terminal devices may need to continuously and repeatedly perform monitoring or start a related procedure, causing a waste of resources and unnecessary interference.

SUMMARY

This application provides a communication method and a communication apparatus, to optimize an assistance procedure between terminal devices in an autonomous selection mode.

According to a first aspect, a communication method is provided. The method includes: receiving coordination information, where the coordination information is used by a first sidelink device to determine a first resource set based on the coordination information, and the first resource set is used by the first sidelink device to send information on the first resource set; and determining that the coordination information includes one or more of the following information: information about a second resource set recommended to the first sidelink device, information about a third resource set scheduled to the first sidelink device, information about a fourth resource set expected to be excluded by the first sidelink device, a coordination parameter or a measurement result used by the first sidelink device to determine the first resource set, and indication information indicating the first sidelink device to determine the first resource set.

A meaning of the information about the second resource set recommended to the first sidelink device is: informing, notifying, or indicating the first sidelink device that a resource in the second resource set is a resource that can be selected by the first sidelink device. The first sidelink device may select the resource in the second resource set to send data or control information, or may not select the resource in the second resource set.

A meaning of the information about the third resource set scheduled to the first sidelink device is: informing, notifying, or indicating the first sidelink device to send data or control information by using a resource in the third resource set. The first sidelink device directly uses the resource in the third resource set to send information.

A meaning of the fourth resource set expected to be excluded by the first sidelink device is: The first sidelink device is not recommended to select a resource in the fourth resource set to send information. The first sidelink device may exclude some or all resources in the fourth resource set, or the first sidelink device may not exclude the resource in the fourth resource set.

The coordination parameter or the measurement result may include, for example, measured RSRP, a channel state information (CSI) feedback result, location information, power, a speed, a path loss, and a priority.

The indication information indicating the first sidelink device to determine the first resource set may be indication information for resource retransmission or indication information for resource reselection.

In this embodiment of this application, a sidelink device that receives the coordination information can identify content of the coordination information, and therefore can perform a coordination procedure based on the identified content of the coordination information, to optimize the coordination procedure.

In a possible implementation of the first aspect, the method further includes: receiving first indication information, and determining the content of the coordination information based on the first indication information. The first indication information and the coordination information may be carried in SCI of a same level, or the first indication information and the coordination information may be carried in SCI of different levels. Alternatively, locations for carrying the first indication information and the coordination information are determined based on the content of the coordination information.

In this embodiment of this application, the first indication information may indicate the content in the coordination information. The sidelink device that receives the coordination information and the first indication information can identify, based on the first indication information, the content included in the coordination information, and therefore the sidelink device that receives the coordination information selects, based on the coordination information, a resource for sending data, to reduce signaling identification complexity and optimize the coordination procedure.

In a possible implementation of the first aspect, the second resource set and/or the third resource set are/is used by the first sidelink device to send information to another sidelink device, and the first indication information further indicates the another sidelink device. Alternatively, the second resource set and/or the third resource set are/is used by the first sidelink device to send information to another sidelink device, and the method further includes: receiving second indication information, where the second indication information indicates the another sidelink device.

In a possible implementation of the first aspect, the information about the second resource set recommended to the first sidelink device includes the information about the second resource set recommended by a second sidelink device to the first sidelink device, and the information about the third resource set scheduled to the first sidelink device includes the information about the second resource set scheduled by the second sidelink device to the first sidelink device. That the first indication information or the second indication information indicates the another sidelink device includes: The first indication information or the second indication information indicates that the another sidelink device is the second sidelink device, or the first indication information or the second indication information indicates that the another sidelink device is any sidelink device, or the first indication information or the second indication information indicates that the another sidelink device is a sidelink device other than the second sidelink device.

In this embodiment of this application, the first indication information or the second indication information may further indicate a sidelink device to which a resource selected by the first sidelink device from the second resource set can be used to send information, and the first indication information or the second indication information may further indicate a sidelink device to which the first sidelink device can send information on the third resource set. According to an indication of the first indication information or the second indication information, a sidelink device to which the second resource set recommended to the first sidelink device and/or the third resource set scheduled to the first sidelink device can be used to send information may be further identified, to provide a reference for resource selection and optimize the coordination procedure.

In a possible implementation of the first aspect, the information about the second resource set recommended to the first sidelink device includes the information about the second resource set recommended by a second sidelink device to the first sidelink device, and the information about the third resource set scheduled to the first sidelink device includes the information about the second resource set scheduled by the second sidelink device to the first sidelink device. The first indication information or the second indication information indicates the first sidelink device to send, on the second resource set and/or the third resource set, data to a sidelink device other than the second sidelink device. The first indication information or the second indication information further indicates whether the second resource set and/or the third resource set include/includes a reserved resource of the second sidelink device, where the reserved resource is used by the second sidelink device to receive or send information.

In a possible implementation of the first aspect, the information about the second resource set recommended to the first sidelink device includes the information about the second resource set recommended by a second sidelink device to the first sidelink device, and the information about the third resource set scheduled to the first sidelink device includes the information about the second resource set scheduled by the second sidelink device to the first sidelink device. The first indication information or the second indication information indicates the first sidelink device to send, on the second resource set and/or the third resource set, data to a sidelink device other than the second sidelink device. The method further includes: receiving third indication information, where the third indication information indicates whether the second resource set and/or the third resource set include/includes a reserved resource of the second sidelink device, and the reserved resource is used by the second sidelink device to receive or send information.

In this embodiment of this application, when the first indication information or the second indication information indicates that the second resource set and/or the third resource set are/is used to send information to the sidelink device other than the second sidelink device, the first indication information, the second indication information, or the third indication information may further indicate whether the second resource set and/or the third resource set include/includes a reserved resource of the second sidelink device, where the reserved resource of the second sidelink device is used by the second sidelink device to receive or send information. When the first indication information, the second indication information, or the third indication information indicates that the second resource set and/or the third resource set do/does not include a reserved resource of the second sidelink device, the first sidelink device may select a resource in the second resource set and/or the third resource set to send information.

In a possible implementation of the first aspect, the fourth resource set is used to expect, when the first sidelink device determines the first resource set for sending information to another sidelink device, the first sidelink device to exclude some or all resources in the fourth resource set. The first indication information further indicates the another sidelink device. Alternatively, the fourth resource set is used by the first sidelink device to exclude some or all resources in the fourth resource set when determining the first resource set for sending information to another sidelink device. The first indication information further indicates the another sidelink device, and the method further includes: receiving second indication information, where the second indication information indicates the another sidelink device.

In a possible implementation of the first aspect, the information about the fourth resource set expected to be excluded by the first sidelink device includes the information about the fourth resource set expected by a second sidelink device to be excluded by the first sidelink device. That the first indication information or the second indication information indicates the another sidelink device includes: The first indication information or the second indication information indicates that the another sidelink device is the second sidelink device, or the first indication information or the second indication information indicates that the another sidelink device is any sidelink device, or the first indication information or the second indication information indicates that the another sidelink device is a sidelink device other than the second sidelink device.

In this embodiment of this application, the first indication information or the second indication information may further indicate a sidelink device, where the first sidelink device may exclude some or all resources in the fourth resource set when determining the first resource set for sending information to the sidelink device. For example, when the first indication information indicates that the first sidelink device selects the first resource set is to send information to the second sidelink device, some or all resources in the fourth resource set should be excluded. If the first sidelink device selects the first resource set to send information to the sidelink device other than the second sidelink device, the first sidelink device may not exclude a resource in the fourth resource set. In this way, resource selection efficiency of the first sidelink device can be improved, and the coordination procedure can be optimized.

In a possible implementation of the first aspect, the first sidelink device determines that the coordination information includes the information about the second resource set recommended by the second sidelink device to the first sidelink device, and the first resource set is used by the first sidelink device to send information to the second sidelink device on the first resource set. The method further includes:

The first sidelink device determines the first resource set in the following order: determining in an intersection set of the second resource set and a fifth resource set, determining in the second resource set, and determining in the fifth resource set. The fifth resource set is a resource set determined by the first sidelink device through monitoring.

In this embodiment of this application, the second resource set is a resource set recommended by the second sidelink device to the first sidelink device, and the fifth resource set is a resource set determined by the first sidelink device through monitoring. Therefore, the intersection set of the second resource set and the fifth resource set is a resource authenticated by both the first sidelink device and the second sidelink device, and the first sidelink device may first select a resource in the intersection set of the second resource set and the fifth resource set. However, because a resource that is to be selected by the first sidelink device is used to send information to the second sidelink device, a resource recommended by the second sidelink device has higher reliability than a resource in the fifth resource set determined by the first sidelink device through monitoring. Therefore, the second-order set for selecting a resource by the first sidelink device is the second resource set, so that resource selection accuracy can be improved.

In a possible implementation of the first aspect, the first sidelink device determines that the coordination information includes the information about the second resource set recommended by the second sidelink device to the first sidelink device, and the first resource set is used by the first sidelink device to send information to the sidelink device other than the second sidelink device on the first resource set, or the first resource set is used by the first sidelink device to send information to any sidelink device on the first resource set. The method further includes: The first sidelink device determines the first resource set in the following order: determining in an intersection set of the second resource set and a fifth resource set, and determining in the second resource set or the fifth resource set. The fifth resource set is a resource set determined by the first sidelink device through monitoring.

In this embodiment of this application, the second resource set is a resource set recommended by the second sidelink device to the first sidelink device, and the fifth resource set is a resource set determined by the first sidelink device through monitoring. Therefore, the intersection set of the second resource set and the fifth resource set is a resource authenticated by both the first sidelink device and the second sidelink device, and the first sidelink device may first select a resource in the intersection set of the second resource set and the fifth resource set. However, because a resource that is to be selected by the first sidelink device is used to send information to the sidelink device other than the second sidelink device or to any sidelink device, a resource recommended by the second sidelink device has same reliability as a resource in the fifth resource set determined by the first sidelink device through monitoring. Therefore, the second-order set for selecting a resource by the first sidelink device is the second resource set or the fifth resource set, so that resource selection accuracy can be improved.

In a possible implementation of the first aspect, the first sidelink device determines that the coordination information includes the information about the fourth resource set expected by the second sidelink device to be excluded by the first sidelink device, and reports a sixth resource set to a higher layer of the first sidelink device, where the sixth resource set is a resource set obtained by the first sidelink device by excluding some or all resources in the fourth resource set and/or a reserved resource, and the reserved resource is a resource determined by the first sidelink device through autonomous monitoring. The higher layer may include: a media access control layer, a radio link control layer, a packet data convergence protocol layer, a service data adaptation layer, or a radio resource control layer.

In this embodiment of this application, before reporting a candidate resource to the higher layer, the first sidelink device excludes some or all resources in the fourth resource set, and the first sidelink device may adjust a quantity of excluded resources, to ensure that a proper quantity of resources are used by the first sidelink device to select a resource in the first resource set.

In a possible implementation of the first aspect, the receiving coordination information includes: receiving, by the first sidelink device, the coordination information on a first resource. A resource that is in the fourth resource set and that is excluded by the first sidelink device from the fifth resource set is a second resource, and the second resource corresponds to a first threshold. Reference signal received power on the first resource is greater than the first threshold, and the first threshold is obtained through calculation based on a first priority and a second priority, where the first priority is a priority corresponding to the second resource or a priority indicated by the coordination information, and the second priority is a priority corresponding to the first sidelink device.

In this embodiment of this application, before reporting a candidate resource to the higher layer, the first sidelink device calculates a threshold of each resource in the fourth resource set based on the first priority and the second priority and excludes a resource whose threshold is less than or equal to the reference signal received power on the first resource, and the first sidelink device may adjust a quantity of excluded resources, to ensure that a proper quantity of resources are used by the first sidelink device to select a resource in the first resource set.

In a possible implementation of the first aspect, that the first sidelink device excludes some or all resources in the fourth resource set from the fifth resource set includes: The first sidelink device reports the fourth resource set and the fifth resource set to the higher layer of the first sidelink device, and the higher layer of the first sidelink device excludes some or all resources in the fourth resource set from the fifth resource set.

In this embodiment of this application, the first sidelink device reports, to the higher layer, the fourth resource set expected to be excluded by the first sidelink device and the fifth resource set determined by the first sidelink device through monitoring, and the higher layer excludes some or all resources in the fourth resource set from the fifth resource set. An interfered resource can be eliminated to the greatest extent, and quality of a selected resource can be ensured.

In a possible implementation of the first aspect, the receiving coordination information includes: receiving, by a third sidelink device, the coordination information from the second sidelink device. The third sidelink device determines that the coordination information includes: one or more of the information about the second resource set recommended by the second sidelink device to the first sidelink device, the information about the third resource set scheduled by the second sidelink device to the first sidelink device, or the information about the fourth resource set expected by the second sidelink device to be excluded by the first sidelink device. The third sidelink device excludes some or all resources in one or more resource sets in the second resource set, the third resource set, or the fourth resource set.

In this embodiment of this application, the third sidelink device receives the coordination information, where the coordination information includes one or more of the information about the second resource set recommended to the first sidelink device, the information about the third resource set scheduled to the first sidelink device, or the information about the fourth resource set expected to be excluded by the first sidelink device. The third sidelink device may exclude some or all resources in the second resource set, the third resource set, and the fourth resource set, to improve resource selection efficiency of the third sidelink device.

In a possible implementation of the first aspect, the second resource set is used by the first sidelink device to determine the first resource set based on the second resource set and a fifth resource set, and the fifth resource set is a resource set determined by the first sidelink device through monitoring.

In this embodiment of this application, the first sidelink device may select a resource in the first resource set from the recommended second resource set and the fifth resource set monitored by the first sidelink device, to send information. The first sidelink device selects, from the recommended resource set and the resource set monitored by the first sidelink device, the resource used to send the information, so that resource selection accuracy can be improved.

In a possible implementation of the first aspect, the information about the fourth resource set expected to be excluded by the first sidelink device includes: the information about the fourth resource set expected by the second sidelink device to be excluded by the first sidelink device. The fourth resource set includes one or more of the following resources: a resource used by the second sidelink device to receive or send information, a reserved resource of the first sidelink device that is preempted by another sidelink device, a resource selected by the second sidelink device from a preconfigured resource pool, a resource determined, by the second sidelink device based on a monitoring result of the second sidelink device, to be reserved by another sidelink device, and a resource determined by the second sidelink device according to an indication of a base station.

In this embodiment of this application, the second sidelink device may determine, in a plurality of manners, a resource, in the fourth resource set, expected to be excluded by the first sidelink device. The resource in the fourth resource set may be determined in one or more of the foregoing plurality of manners. For the reserved resource of the first sidelink device that is preempted by the another sidelink device, the second sidelink device may assist the first sidelink device in performing preemption detection, use a detected preempted resource as a resource in the fourth resource set, send information about the fourth resource set to the first sidelink device by using coordination information, and expect the first sidelink device to exclude the resource. The coordination procedure can be optimized by assisting the first sidelink device in performing preemption detection.

In a possible implementation of the first aspect, the information about the second resource set recommended to the first sidelink device includes the information about the second resource set recommended by the second sidelink device to the first sidelink device, and the information about the third resource set scheduled to the first sidelink device includes the information about the third resource set scheduled by the second sidelink device to the first sidelink device. A resource in the second resource set and/or the third resource set includes one or more of the following resources:

a resource selected by the second sidelink device based on a monitoring result of the second sidelink device, a resource selected by the second sidelink device from a preconfigured resource pool, and a resource determined by the second sidelink device according to an indication of the base station.

In this embodiment of this application, the second sidelink device may determine the second resource set and/or the third resource set in a plurality of manners, and the resource in the second resource set and/or the third resource set may include one or more of the foregoing plurality of manners. The resource set is recommended or scheduled in a plurality of manners, to improve accuracy of resource recommendation or scheduling and optimize the coordination procedure.

According to a second aspect, a communication method is provided. The communication method may be performed by a second sidelink device, and includes: The second sidelink device determines coordination information, where the coordination information is used by a first sidelink device to select a first resource set based on the coordination information, the first resource set is used by the first sidelink device to send information on the first resource set, and the coordination information includes one or more of the following information: information about a second resource set recommended to the first sidelink device, information about a third resource set scheduled to the first sidelink device, information about a fourth resource set expected to be excluded by the first sidelink device, a coordination parameter or a measurement result used by the first sidelink device to determine the first resource set, and indication information indicating the first sidelink device to determine the first resource set.

A meaning of the information about the second resource set recommended to the first sidelink device is: The second sidelink device informs, notifies, or indicates the first sidelink device that a resource in the second resource set is a resource that can be selected by the first sidelink device. The first sidelink device may select the resource in the second resource set to send data or control information, or may not select the resource in the second resource set.

A meaning of the information about the third resource set scheduled to the first sidelink device is: The second sidelink device informs, notifies, or indicates the first sidelink device to send data or control information by using a resource in the third resource set. The first sidelink device directly uses the resource in the third resource set to send information.

A meaning of the fourth resource set expected to be excluded by the first sidelink device is: The second sidelink device does not recommend the first sidelink device to select a resource in the fourth resource set to send information. The first sidelink device may exclude some or all resources in the fourth resource set, or the first sidelink device may not exclude the resource in the fourth resource set.

The coordination parameter or the measurement result may include, for example, measured RSRP, a channel state information (CSI) feedback result, location information, power, a speed, a path loss, and a priority.

The indication information indicating the first sidelink device to determine the first resource set may be indication information for resource retransmission or indication information for resource reselection.

In this embodiment of this application, the second sidelink device sends the coordination information. A sidelink device that receives the coordination information can identify content of the coordination information, and therefore can perform a coordination procedure based on the identified content of the coordination information, to optimize the coordination procedure.

In a possible implementation of the second aspect, the method further includes: sending first indication information, where the first indication information indicates the content of the coordination information. The first indication information and the coordination information may be carried in SCI of a same level, or the first indication information and the coordination information may be carried in different pieces of SCI. Alternatively, locations for carrying the first indication information and the coordination information are determined based on the content of the coordination information.

In this embodiment of this application, the first indication information may indicate the content in the coordination information. The sidelink device that receives the coordination information and the first indication information can identify, based on the first indication information, the content included in the coordination information, and therefore the sidelink device that receives the coordination information selects, based on the coordination information, a resource for sending data, to reduce signaling identification complexity and optimize the coordination procedure.

In a possible implementation of the second aspect, the second resource set and/or the third resource set are/is used by the first sidelink device to send information to another sidelink device, and the first indication information further indicates the another sidelink device. Alternatively, the second resource set and/or the third resource set are/is used by the first sidelink device to send information to another sidelink device, and the method further includes: sending second indication information, where the second indication information indicates the another sidelink device.

In a possible implementation of the second aspect, the information about the second resource set recommended to the first sidelink device includes the information about the second resource set recommended by the second sidelink device to the first sidelink device, and the information about the third resource set scheduled to the first sidelink device includes the information about the second resource set scheduled by the second sidelink device to the first sidelink device. That the first indication information or the second indication information indicates the another sidelink device includes: The first indication information or the second indication information indicates that the another sidelink device is the second sidelink device, or the first indication information or the second indication information indicates that the another sidelink device is any sidelink device, or the first indication information or the second indication information indicates that the another sidelink device is a sidelink device other than the second sidelink device.

In this embodiment of this application, the first indication information or the second indication information may further indicate a sidelink device to which a resource selected by the first sidelink device from the second resource set can be used to send information, and the first indication information or the second indication information may further indicate a sidelink device to which the first sidelink device can send information on the third resource set. According to an indication of the first indication information or the second indication information, a sidelink device to which the second resource set recommended to the first sidelink device and/or the third resource set scheduled to the first sidelink device can be used to send information may be further identified, to provide a reference for resource selection and optimize the coordination procedure.

In a possible implementation of the second aspect, the information about the second resource set recommended to the first sidelink device includes the information about the second resource set recommended by the second sidelink device to the first sidelink device, and the information about the third resource set scheduled to the first sidelink device includes the information about the second resource set scheduled by the second sidelink device to the first sidelink device. The first indication information or the second indication information indicates the first sidelink device to send, on the second resource set and/or the third resource set, data to a sidelink device other than the second sidelink device. The first indication information or the second indication information further indicates whether the second resource set and/or the third resource set include/includes a reserved resource of the second sidelink device, where the reserved resource is used by the second sidelink device to receive or send information.

In a possible implementation of the second aspect, the information about the second resource set recommended to the first sidelink device includes the information about the second resource set recommended by the second sidelink device to the first sidelink device, and the information about the third resource set scheduled to the first sidelink device includes the information about the second resource set scheduled by the second sidelink device to the first sidelink device. The first indication information or the second indication information indicates the first sidelink device to send, on the second resource set and/or the third resource set, data to a sidelink device other than the second sidelink device. The method further includes: sending third indication information, where the third indication information indicates whether the second resource set and/or the third resource set include/includes a reserved resource of the second sidelink device, and the reserved resource is used by the second sidelink device to receive or send information.

In this embodiment of this application, when the first indication information or the second indication information indicates that the second resource set and/or the third resource set are/is used to send information to the sidelink device other than the second sidelink device, the first indication information, the second indication information, or the third indication information may further indicate whether the second resource set and/or the third resource set include/includes a reserved resource of the second sidelink device, where the reserved resource of the second sidelink device is used by the second sidelink device to receive or send information. When the first indication information, the second indication information, or the third indication information indicates that the second resource set and/or the third resource set do/does not include a reserved resource of the second sidelink device, the first sidelink device may select a resource in the second resource set and/or the third resource set to send information.

In a possible implementation of the second aspect, the fourth resource set is used to expect, when the first sidelink device determines the first resource set for sending information to another sidelink device, the first sidelink device to exclude some or all resources in the fourth resource set. The first indication information further indicates the another sidelink device. Alternatively, the fourth resource set is used to expect, when the first sidelink device determines the first resource set for sending information to another sidelink device, the first sidelink device to exclude some or all resources in the fourth resource set. The first indication information further indicates the another sidelink device, and the method further includes: sending second indication information, where the second indication information indicates the another sidelink device.

In a possible implementation of the second aspect, the information about the fourth resource set expected to be excluded by the first sidelink device includes the information about the fourth resource set expected by the second sidelink device to be excluded by the first sidelink device. That the first indication information or the second indication information indicates the another sidelink device includes: The first indication information or the second indication information indicates that the another sidelink device is the second sidelink device, or the first indication information or the second indication information indicates that the another sidelink device is any sidelink device, or the first indication information or the second indication information indicates that the another sidelink device is a sidelink device other than the second sidelink device.

In this embodiment of this application, the first indication information or the second indication information may further indicate a sidelink device, where the first sidelink device may exclude some or all resources in the fourth resource set when determining the first resource set for sending information to the sidelink device. For example, when the first indication information indicates that the first sidelink device selects the first resource set is to send information to the second sidelink device, some or all resources in the fourth resource set should be excluded. If the first sidelink device selects the first resource set to send information to the sidelink device other than the second sidelink device, the first sidelink device may not exclude a resource in the fourth resource set. In this way, resource selection efficiency of the first sidelink device can be improved, and the coordination procedure can be optimized.

In a possible implementation of the second aspect, the second resource set is used by the first sidelink device to select the first resource set based on the second resource set and a fifth resource set, and the fifth resource set is a resource set determined by the first sidelink device through monitoring.

In this embodiment of this application, the first sidelink device may select a resource in the first resource set from the recommended second resource set and the fifth resource set monitored by the first sidelink device, to send information. The first sidelink device selects, from the recommended resource set and the resource set monitored by the first sidelink device, the resource used to send the information, so that resource selection accuracy can be improved.

In a possible implementation of the second aspect, the information about the fourth resource set expected to be excluded by the first sidelink device includes: the information about the fourth resource set expected by the second sidelink device to be excluded by the first sidelink device. The fourth resource set includes one or more of the following resources: a resource used by the second sidelink device to receive or send information, a reserved resource of the first sidelink device that is preempted by another sidelink device, a resource selected by the second sidelink device from a preconfigured resource pool, a resource determined, by the second sidelink device based on a monitoring result of the second sidelink device, to be reserved by another sidelink device, and a resource determined by the second sidelink device according to an indication of a base station.

In this embodiment of this application, the second sidelink device may determine, in a plurality of manners, a resource, in the fourth resource set, expected to be excluded by the first sidelink device. The resource in the fourth resource set may include one or more of the foregoing plurality of manners. For the reserved resource of the first sidelink device that is preempted by the another sidelink device, the second sidelink device may assist the first sidelink device in performing preemption detection, use a detected preempted resource as a resource in the fourth resource set, send information about the fourth resource set to the first sidelink device by using coordination information, and expect the first sidelink device to exclude the resource. The coordination procedure can be optimized by assisting the first sidelink device in performing preemption detection.

In a possible implementation of the second aspect, the information about the second resource set recommended to the first sidelink device includes the information about the second resource set recommended by the second sidelink device to the first sidelink device, and the information about the third resource set scheduled to the first sidelink device includes the information about the third resource set scheduled by the second sidelink device to the first sidelink device. A resource in the second resource set and/or the third resource set includes one or more of the following resources: a resource selected by the second sidelink device based on a monitoring result of the second sidelink device, a resource selected by the second sidelink device from a preconfigured resource pool, and a resource determined by the second sidelink device according to an indication of the base station.

In this embodiment of this application, the second sidelink device may determine the second resource set and/or the third resource set in a plurality of manners, and the resource in the second resource set and/or the third resource set may include one or more of the foregoing plurality of manners. The resource set is recommended or scheduled in a plurality of manners, to improve accuracy of resource recommendation or scheduling and optimize the coordination procedure.

In a possible implementation of the second aspect, the second sidelink device monitors a plurality of resources in a monitoring time window, and excludes a reserved or occupied resource in a selection time window based on a monitoring result. A resource selected by the second sidelink device based on the monitoring result of the second sidelink device includes some or all remaining resources after the reserved or occupied resource is excluded by the second sidelink device in the selection time window.

In this embodiment of this application, after excluding the reserved or occupied resource based on the monitoring result of the second sidelink device, the second sidelink device may select a resource in the corresponding selection time window as a resource in the second resource set and/or the third resource set and recommend the resource to the first sidelink device.

In a possible implementation of the second aspect, the excluding a reserved or occupied resource in the selection time window based on a monitoring result includes: excluding the reserved or occupied resource in the selection time window based on a priority. The first resource set is used by the first sidelink device to send data to the second sidelink device, and the priority is a third priority. Alternatively, the first resource set is used by the first sidelink device to send data to any sidelink device, and the priority is a fourth priority. Alternatively, the first resource set is used by the first sidelink device to send data to the sidelink device other than the second sidelink device, and the priority is a fifth priority. A relationship between a value of the third priority, a value of the fourth priority, and a value of the fifth priority is: the value of the third priority$\leq$the value of the fourth priority$\leq$the value of the fifth priority.

In this embodiment of this application, a smaller value of the priority indicates more resources excluded based on the priority, less interference to a finally left resource, and better quality. Therefore, when the first resource set is used by the first sidelink device to send data to the second sidelink device, a resource selected by the second sidelink device is expected to have less interference, so that the value of the third priority is smaller. When the first resource set is used by the first sidelink device to send data to the sidelink device other than the second sidelink device, a requirement on an interference degree of a finally left resource is low. Therefore, the value of the fifth priority may be greater than the value of the third priority and the value of the fourth priority.

According to a third aspect, a communication method is provided. The communication method may be performed by a second sidelink device, and includes: receiving first indication information and trigger information, where the trigger information is used to trigger a coordination procedure; and indicating, based on the first indication information, that the trigger information includes one or more of the following information: third indication information used to identify the trigger information, second indication information indicating content of coordination information, and a trigger parameter used by the second sidelink device to determine the coordination information. The third indication information may be 1 bit. A function of the third indication information is to indicate, to the second sidelink device, that current information is the trigger information, and the second sidelink device triggers the coordination procedure after identifying the trigger information. The second indication information indicates, to the second sidelink device, content that is to be included in the coordination information sent by the second sidelink device to a first sidelink device.

In this embodiment of this application, the first indication information indicates content of the trigger information, to reduce signaling identification complexity and optimize the coordination procedure.

In a possible implementation of the third aspect, the content of the coordination information includes one or more of the following information: information about a second resource set recommended to the first sidelink device, information about a third resource set scheduled to the first sidelink device, information about a fourth resource set expected to be excluded by the first sidelink device, a coordination parameter or a measurement result used by the first sidelink device to determine a first resource set, and indication information indicating the first sidelink device to determine the first resource set. The first resource set is used by the first sidelink device to send information on the first resource set.

A meaning of the information about the second resource set recommended to the first sidelink device is: informing, notifying, or indicating the first sidelink device that a resource in the second resource set is a resource that can be selected by the first sidelink device. The first sidelink device may select the resource in the second resource set to send data or control information, or may not select the resource in the second resource set.

A meaning of the information about the third resource set scheduled to the first sidelink device is: informing, notifying, or indicating the first sidelink device to send data or control information by using a resource in the third resource set. The first sidelink device directly uses the resource in the third resource set to send information.

A meaning of the fourth resource set expected to be excluded by the first sidelink device is: The first sidelink device is not recommended to select a resource in the fourth resource set to send information. The first sidelink device may exclude some or all resources in the fourth resource set, or the first sidelink device may not exclude the resource in the fourth resource set.

The coordination parameter or the measurement result may include, for example, measured RSRP, a channel state information (CSI) feedback result, location information, power, a speed, a path loss, and a priority.

The indication information indicating the first sidelink device to determine the first resource set may be indication information for resource retransmission or indication information for resource reselection.

In this embodiment of this application, when the content of the trigger information includes the second indication information and/or the trigger parameter, the second sidelink device may determine, based on the second indication information and/or the trigger parameter, specific content of the coordination information that is to be provided for the first sidelink device, to assist the first sidelink device in resource selection in a targeted manner, and therefore optimize the coordination procedure.

In a possible implementation of the third aspect, the trigger parameter includes at least one of the following information: a quantity of sub-channels, a size of a selection window, a size of a monitoring window, a periodicity, or priority information.

According to a fourth aspect, a communication method is provided. The communication method may be performed by a first sidelink device, and includes: The first sidelink device determines first indication information and trigger information, where the trigger information is used to trigger a coordination procedure, and the first indication information indicates that the trigger information includes one or more of the following information: third indication information used to identify the trigger information, second indication information indicating content of coordination information, and a trigger parameter used by a second sidelink device to determine the coordination information. The first sidelink device sends the first indication information and the trigger information. The third indication information may be 1 bit. A function of the third indication information is to indicate that current information is the trigger information. The second indication information indicates content that is to be included in the coordination information sent to the first sidelink device.

In this embodiment of this application, the first indication information indicates content of the trigger information, to reduce signaling identification complexity and optimize the coordination procedure.

In a possible implementation of the third aspect, the content of the coordination information includes one or more of the following information: information about a second resource set recommended to the first sidelink device, information about a third resource set scheduled to the first sidelink device, information about a fourth resource set expected to be excluded by the first sidelink device, a coordination parameter or a measurement result used by the first sidelink device to determine a first resource set, and indication information indicating the first sidelink device to determine the first resource set. The first resource set is used by the first sidelink device to send information on the first resource set.

A meaning of the information about the second resource set recommended to the first sidelink device is: informing, notifying, or indicating the first sidelink device that a resource in the second resource set is a resource that can be selected by the first sidelink device. The first sidelink device may select the resource in the second resource set to send data or control information, or may not select the resource in the second resource set.

A meaning of the information about the third resource set scheduled to the first sidelink device is: informing, notifying, or indicating the first sidelink device to send data or control information by using a resource in the third resource set. The first sidelink device directly uses the resource in the third resource set to send information.

A meaning of the fourth resource set expected to be excluded by the first sidelink device is: The first sidelink device is not recommended to select a resource in the fourth resource set to send information. The first sidelink device may exclude some or all resources in the fourth resource set, or the first sidelink device may not exclude the resource in the fourth resource set.

The coordination parameter or the measurement result may include, for example, measured RSRP, a channel state information (CSI) feedback result, location information, power, a speed, a path loss, and a priority.

The indication information indicating the first sidelink device to determine the first resource set may be indication information for resource retransmission or indication information for resource reselection.

In this embodiment of this application, when the content of the trigger information includes the second indication information and/or the trigger parameter, a sidelink device that receives the trigger information may determine, based on the second indication information and/or the trigger parameter, specific content of the coordination information that is to be provided for the first sidelink device, to assist the first sidelink device in resource selection in a targeted manner, and therefore optimize the coordination procedure.

In a possible implementation of the fourth aspect, the trigger parameter includes at least one of the following information: a quantity of sub-channels, a size of a selection window, a size of a monitoring window, a periodicity, or priority information.

According to a fifth aspect, a communication apparatus is provided. The apparatus includes: a transceiver module, configured to receive coordination information, where the coordination information is used by a first sidelink device to determine a first resource set based on the coordination information, and the first resource set is used by the first sidelink device to send information on the first resource set; and a processing module, configured to determine that the coordination information includes one or more of the following information: information about a second resource set recommended to the first sidelink device, information about a third resource set scheduled to the first sidelink device, information about a fourth resource set expected to be excluded by the first sidelink device, a coordination parameter or a measurement result used by the first sidelink device to determine the first resource set, and indication information indicating the first sidelink device to determine the first resource set.

A meaning of the information about the second resource set recommended to the first sidelink device is: informing, notifying, or indicating the first sidelink device that a resource in the second resource set is a resource that can be selected by the first sidelink device. The first sidelink device may select the resource in the second resource set to send data or control information, or may not select the resource in the second resource set.

A meaning of the information about the third resource set scheduled to the first sidelink device is: informing, notifying, or indicating the first sidelink device to send data or control information by using a resource in the third resource set. The first sidelink device directly uses the resource in the third resource set to send information.

A meaning of the fourth resource set expected to be excluded by the first sidelink device is: The first sidelink device is not recommended to select a resource in the fourth resource set to send information. The first sidelink device may exclude some or all resources in the fourth resource set, or the first sidelink device may not exclude the resource in the fourth resource set.

The coordination parameter or the measurement result may include, for example, measured RSRP, a channel state information (CSI) feedback result, location information, power, a speed, a path loss, and a priority.

The indication information indicating the first sidelink device to determine the first resource set may be indication information for resource retransmission or indication information for resource reselection.

In this embodiment of this application, a sidelink device that receives the coordination information can identify content of the coordination information, and therefore can perform a coordination procedure based on the identified content of the coordination information, to optimize the coordination procedure.

In a possible implementation of the fifth aspect, the transceiver module is further configured to receive first indication information. That the processing module is configured to determine the coordination information includes: The processing module is configured to determine the content of the coordination information based on the first indication information.

The first indication information and the coordination information may be carried in SCI of a same level, or the first indication information and the coordination information may be carried in different pieces of SCI. Alternatively, locations for carrying the first indication information and the coordination information are determined based on the content of the coordination information.

In this embodiment of this application, the first indication information may indicate the content in the coordination information. The sidelink device that receives the coordination information and the first indication information can identify, based on the first indication information, the content included in the coordination information, and therefore the sidelink device that receives the coordination information selects, based on the coordination information, a resource for sending data, to reduce signaling identification complexity and optimize the coordination procedure.

In a possible implementation of the fifth aspect, the second resource set and/or the third resource set are/is used by the first sidelink device to send information to another sidelink device, and the first indication information further indicates the another sidelink device. Alternatively, the second resource set and/or the third resource set are/is used by the first sidelink device to send information to another sidelink device, and the transceiver module is further configured to: receive second indication information, where the second indication information indicates the another sidelink device.

In a possible implementation of the fifth aspect, the information about the second resource set recommended to the first sidelink device includes the information about the second resource set recommended by a second sidelink device to the first sidelink device, and the information about the third resource set scheduled to the first sidelink device includes the information about the second resource set scheduled by the second sidelink device to the first sidelink device. That the first indication information or the second indication information indicates the another sidelink device includes: The first indication information or the second indication information indicates that the another sidelink device is the second sidelink device, or the first indication information or the second indication information indicates that the another sidelink device is any sidelink device, or the first indication information or the second indication information indicates that the another sidelink device is a sidelink device other than the second sidelink device.

In this embodiment of this application, the first indication information or the second indication information may further indicate a sidelink device to which a resource selected by the first sidelink device from the second resource set can be used to send information, and the first indication information or the second indication information may further indicate a sidelink device to which the first sidelink device can send information on the third resource set. According to an indication of the first indication information or the second indication information, a sidelink device to which the second resource set recommended to the first sidelink device and/or the third resource set scheduled to the first sidelink device can be used to send information may be further identified, to provide a reference for resource selection and optimize the coordination procedure.

In a possible implementation of the fifth aspect, the information about the second resource set recommended to the first sidelink device includes the information about the second resource set recommended by a second sidelink device to the first sidelink device, and the information about the third resource set scheduled to the first sidelink device includes the information about the second resource set scheduled by the second sidelink device to the first sidelink device. The first indication information or the second indication information indicates the first sidelink device to send, on the second resource set and/or the third resource set, data to a sidelink device other than the second sidelink device. The first indication information or the second indication information further indicates whether the second resource set and/or the third resource set include/includes a reserved resource of the second sidelink device, where the reserved resource is used by the second sidelink device to receive or send information.

In a possible implementation of the first aspect, the information about the second resource set recommended to the first sidelink device includes the information about the second resource set recommended by a second sidelink device to the first sidelink device, and the information about the third resource set scheduled to the first sidelink device includes the information about the second resource set scheduled by the second sidelink device to the first sidelink device. The first indication information or the second indication information indicates the first sidelink device to send, on the second resource set and/or the third resource set, data to a sidelink device other than the second sidelink device. The transceiver module is further configured to receive third indication information, where the third indication information indicates whether the second resource set and/or the third resource set include/includes a reserved resource of the second sidelink device, and the reserved resource is used by the second sidelink device to receive or send information.

In this embodiment of this application, when the first indication information or the second indication information indicates that the second resource set and/or the third resource set are/is used to send information to the sidelink device other than the second sidelink device, the first indication information, the second indication information, or the third indication information may further indicate whether the second resource set and/or the third resource set include/includes a reserved resource of the second sidelink device, where the reserved resource of the second sidelink device is used by the second sidelink device to receive or send information. When the first indication information, the second indication information, or the third indication information indicates that the second resource set and/or the third resource set do/does not include a reserved resource of the second sidelink device, the first sidelink device may select a resource in the second resource set and/or the third resource set to send information.

In a possible implementation of the fifth aspect, the fourth resource set is used to expect, when the first sidelink device determines the first resource set for sending information to another sidelink device, the first sidelink device to exclude some or all resources in the fourth resource set. The first indication information further indicates the another sidelink device. Alternatively, the fourth resource set is used by the first sidelink device to exclude some or all resources in the fourth resource set when determining the first resource set for sending information to another sidelink device. The first indication information further indicates the another sidelink device, and the transceiver module is further configured to receive second indication information, where the second indication information indicates the another sidelink device.

In a possible implementation of the fifth aspect, the information about the fourth resource set expected to be excluded by the first sidelink device includes the information about the fourth resource set expected by the second sidelink device to be excluded by the first sidelink device. That the first indication information or the second indication information indicates the another sidelink device includes: The first indication information or the second indication information indicates that the another sidelink device is the second sidelink device, or the first indication information or the second indication information indicates that the another sidelink device is any sidelink device, or the first indication information or the second indication information indicates that the another sidelink device is a sidelink device other than the second sidelink device.

In this embodiment of this application, the first indication information or the second indication information may further indicate a sidelink device, where the first sidelink device may exclude some or all resources in the fourth resource set when determining the first resource set for sending information to the sidelink device. For example, when the first indication information indicates that the first sidelink device selects the first resource set is to send information to the second sidelink device, some or all resources in the fourth resource set should be excluded. If the first sidelink device selects the first resource set to send information to the sidelink device other than the second sidelink device, the first sidelink device may not exclude a resource in the fourth resource set. In this way, resource selection efficiency of the first sidelink device can be improved, and the coordination procedure can be optimized.

In a possible implementation of the fifth aspect, the processing module is configured to determine that the coordination information includes the information about the second resource set recommended by the second sidelink device to the first sidelink device, and the first resource set is used by the first sidelink device to send information to the second sidelink device on the first resource set. The processing module is further configured to determine the first resource set in the following order: determining in an intersection set of the second resource set and a fifth resource set, determining in the second resource set, and determining in the fifth resource set. The fifth resource set is a resource set determined by the first sidelink device through monitoring.

In this embodiment of this application, the second resource set is a resource set recommended by the second sidelink device to the first sidelink device, and the fifth resource set is a resource set determined by the first sidelink device through monitoring. Therefore, the intersection set of the second resource set and the fifth resource set is a resource authenticated by both the first sidelink device and the second sidelink device, and the first sidelink device may first select a resource in the intersection set of the second resource set and the fifth resource set. However, a resource that is to be selected by the first sidelink device is used to send information to the second sidelink device, a resource recommended by the second sidelink device has higher reliability than a resource in the fifth resource set determined by the first sidelink device through monitoring. Therefore, the second-order set for selecting a resource by the first sidelink device is the second resource set, so that resource selection accuracy can be improved.

In a possible implementation of the fifth aspect, the first sidelink device determines that the coordination information includes the information about the second resource set recommended by the second sidelink device to the first sidelink device, and the first resource set is used by the first sidelink device to send information to the sidelink device other than the second sidelink device on the first resource set, or the first resource set is used by the first sidelink device to send information to any sidelink device on the first resource set. The processing module is further configured to determine the first resource set in the following order: determining in an intersection set of the second resource set and a fifth resource set, and determining in the second resource set or the fifth resource set. The fifth resource set is a resource set determined by the first sidelink device through monitoring.

In this embodiment of this application, the second resource set is a resource set recommended by the second sidelink device to the first sidelink device, and the fifth resource set is a resource set determined by the first sidelink device through monitoring. Therefore, the intersection set of the second resource set and the fifth resource set is a resource authenticated by both the first sidelink device and the second sidelink device, and the first sidelink device may first select a resource in the intersection set of the second resource set and the fifth resource set. However, because a resource that is to be selected by the first sidelink device is used to send information to the sidelink device other than the second sidelink device or to any sidelink device, a resource recommended by the second sidelink device has same reliability as a resource in the fifth resource set determined by the first sidelink device through monitoring. Therefore, the second-order set for selecting a resource by the first sidelink device is the second resource set or the fifth resource set, so that resource selection accuracy can be improved.

In a possible implementation of the fifth aspect, the communication apparatus is the first sidelink device, and the processing module is further configured to: determine that the coordination information includes the information about the fourth resource set expected by the second sidelink device to be excluded by the first sidelink device, and report a sixth resource set to a higher layer of the first sidelink device, where the sixth resource set is a resource set obtained by the first sidelink device by excluding some or all resources in the fourth resource set and/or a reserved resource, and the reserved resource is a resource determined by the first sidelink device through autonomous monitoring. The higher layer may include: a media access control layer, a radio link control layer, a packet data convergence protocol layer, a service data adaptation layer, or a radio resource control layer.

In this embodiment of this application, before reporting a candidate resource to the higher layer, the first sidelink device excludes some or all resources in the fourth resource set, and the first sidelink device may adjust a quantity of excluded resources, to ensure that a proper quantity of resources are used by the first sidelink device to select a resource in the first resource set.

In a possible implementation of the fifth aspect, that the transceiver module is configured to receive the coordination information includes: The transceiver module is configured to receive the coordination information on a first resource. A resource that is in the fourth resource set and that is excluded by the first sidelink device from the fifth resource set is a second resource, and the second resource corresponds to a first threshold. Reference signal received power on the first resource is greater than the first threshold, and the first threshold is obtained through calculation based on a first priority and a second priority, where the first priority is a priority corresponding to the second resource or a priority indicated by the coordination information, and the second priority is a priority corresponding to the first sidelink device.

In this embodiment of this application, before reporting a candidate resource to the higher layer, the first sidelink device calculates a threshold of each resource in the fourth resource set based on the first priority and the second priority and excludes a resource whose threshold is less than or equal to the reference signal received power on the first resource, and the first sidelink device may adjust a quantity of excluded resources, to ensure that a proper quantity of resources are used by the first sidelink device to select a resource in the first resource set. In a possible implementation of the fifth aspect, that the processing module is configured to exclude some or all resources in the fourth resource set from the fifth resource set includes: The processing module is configured to report the fourth resource set and the fifth resource set to the higher layer of the first sidelink device, and the higher layer of the first sidelink device excludes some or all resources in the fourth resource set from the fifth resource set.

In this embodiment of this application, the first sidelink device reports, to the higher layer, the fourth resource set expected to be excluded by the first sidelink device and the fifth resource set determined by the first sidelink device through monitoring, and the higher layer excludes some or all resources in the fourth resource set from the fifth resource set. An interfered resource can be eliminated to the greatest extent, and quality of a selected resource can be ensured.

In a possible implementation of the fifth aspect, the communication apparatus is a third sidelink device, and that the receiving module is configured to receive the coordination information includes: The receiving module is configured to receive the coordination information from the second sidelink device. The processing module is configured to determine that the coordination information includes: one or more of the information about the second resource set recommended by the second sidelink device to the first sidelink device, the information about the third resource set scheduled by the second sidelink device to the first sidelink device, or the information about the fourth resource set expected by the second sidelink device to be excluded by the first sidelink device. The third sidelink device excludes some or all resources in one or more resource sets in the second resource set, the third resource set, or the fourth resource set.

In this embodiment of this application, the third sidelink device receives the coordination information, where the coordination information includes one or more of the information about the second resource set recommended to the first sidelink device, the information about the third resource set scheduled to the first sidelink device, or the information about the fourth resource set expected to be excluded by the first sidelink device. The third sidelink device may exclude some or all resources in the second resource set, the third resource set, and the fourth resource set, to improve resource selection efficiency of the third sidelink device.

In a possible implementation of the fifth aspect, the second resource set is used by the first sidelink device to select the first resource set based on the second resource set and a fifth resource set, and the fifth resource set is a resource set determined by the first sidelink device through monitoring.

In this embodiment of this application, the first sidelink device may determine a resource in the first resource set based on the recommended second resource set and the fifth resource set monitored by the first sidelink device, to send information. The first sidelink device selects, from the recommended resource set and the resource set monitored by the first sidelink device, the resource used to send the information, so that resource selection accuracy can be improved.

In a possible implementation of the fifth aspect, the information about the fourth resource set expected to be excluded by the first sidelink device includes: the information about the fourth resource set expected by the second sidelink device to be excluded by the first sidelink device. The fourth resource set includes one or more of the following resources: a resource used by the second sidelink device to receive or send information, a reserved resource of the first sidelink device that is preempted by another sidelink device, a resource selected by the second sidelink device from a preconfigured resource pool, a resource determined, by the second sidelink device based on a monitoring result of the second sidelink device, to be reserved by another sidelink device, and a resource determined by the second sidelink device according to an indication of a base station.

In this embodiment of this application, the second sidelink device may determine, in a plurality of manners, a resource, in the fourth resource set, expected to be excluded by the first sidelink device. The resource in the fourth resource set may include one or more of the foregoing plurality of manners. For the reserved resource of the first sidelink device that is preempted by the another sidelink device, the second sidelink device may assist the first sidelink device in performing preemption detection, use a detected preempted resource as a resource in the fourth resource set, send information about the fourth resource set to the first sidelink device by using coordination information, and expect the first sidelink device to exclude the resource. The coordination procedure can be optimized by assisting the first sidelink device in performing preemption detection.

In a possible implementation of the fifth aspect, the information about the second resource set recommended to the first sidelink device includes the information about the second resource set recommended by the second sidelink device to the first sidelink device, and the information about the third resource set scheduled to the first sidelink device includes the information about the third resource set scheduled by the second sidelink device to the first sidelink device. A resource in the second resource set and/or the third resource set includes one or more of the following resources: a resource selected by the second sidelink device based on a monitoring result of the second sidelink device, a resource selected by the second sidelink device from a preconfigured resource pool, and a resource determined by the second sidelink device according to an indication of the base station.

In this embodiment of this application, the second sidelink device may determine the second resource set and/or the third resource set in a plurality of manners, and the resource in the second resource set and/or the third resource set may include one or more of the foregoing plurality of manners. The resource set is recommended or scheduled in a plurality of manners, to improve accuracy of resource recommendation or scheduling and optimize the coordination procedure.

According to a sixth aspect, a communication apparatus is provided. The communication apparatus may be a second sidelink device, and includes: a processing module, configured to determine coordination information, where the coordination information is used by a first sidelink device to select a first resource set based on the coordination information, the first resource set is used by the first sidelink device to send information on the first resource set, and the coordination information includes one or more of the following information: information about a second resource set recommended to the first sidelink device, information about a third resource set scheduled to the first sidelink device, information about a fourth resource set expected to be excluded by the first sidelink device, a coordination parameter or a measurement result used by the first sidelink device to determine the first resource set, and indication information indicating the first sidelink device to determine the first resource set.

A meaning of the information about the second resource set recommended to the first sidelink device is: The second sidelink device informs, notifies, or indicates the first sidelink device that a resource in the second resource set is a resource that can be selected by the first sidelink device. The first sidelink device may select the resource in the second resource set to send data or control information, or may not select the resource in the second resource set.

A meaning of the information about the third resource set scheduled to the first sidelink device is: The second sidelink device informs, notifies, or indicates the first sidelink device to send data or control information by using a resource in the third resource set. The first sidelink device directly uses the resource in the third resource set to send information.

A meaning of the fourth resource set expected to be excluded by the first sidelink device is: The second sidelink device does not recommend the first sidelink device to select a resource in the fourth resource set to send information. The first sidelink device may exclude some or all resources in the fourth resource set, or the first sidelink device may not exclude the resource in the fourth resource set.

The coordination parameter or the measurement result may include, for example, measured RSRP, a channel state information (CSI) feedback result, location information, power, a speed, a path loss, and a priority.

The indication information indicating the first sidelink device to determine the first resource set may be indication information for resource retransmission or indication information for resource reselection.

In this embodiment of this application, the second sidelink device sends the coordination information. A sidelink device that receives the coordination information can identify content of the coordination information, and therefore can perform a coordination procedure based on the identified content of the coordination information, to optimize the coordination procedure.

In a possible implementation of the sixth aspect, a transceiver module is further configured to send first indication information, where the first indication information indicates the content of the coordination information. The first indication information and the coordination information may be carried in SCI of a same level, or the first indication information and the coordination information may be carried in different pieces of SCI. Alternatively, locations for carrying the first indication information and the coordination information are determined based on the content of the coordination information.

In this embodiment of this application, the first indication information may indicate the content in the coordination information. The sidelink device that receives the coordination information and the first indication information can identify, based on the first indication information, the content included in the coordination information, and therefore the sidelink device that receives the coordination information selects, based on the coordination information, a resource for sending data, to reduce signaling identification complexity and optimize the coordination procedure.

In a possible implementation of the sixth aspect, the second resource set and/or the third resource set are/is used by the first sidelink device to send information to another sidelink device, and the first indication information further indicates the another sidelink device. Alternatively, the second resource set and/or the third resource set are/is used by the first sidelink device to send information to another sidelink device, and the transceiver module is further configured to: send second indication information, where the second indication information indicates the another sidelink device.

In a possible implementation of the sixth aspect, the information about the second resource set recommended to the first sidelink device includes the information about the second resource set recommended by the second sidelink device to the first sidelink device, and the information about the third resource set scheduled to the first sidelink device includes the information about the second resource set scheduled by the second sidelink device to the first sidelink device. That the first indication information or the second indication information indicates the another sidelink device includes: The first indication information or the second indication information indicates that the another sidelink device is the second sidelink device, or the first indication information or the second indication information indicates that the another sidelink device is any sidelink device, or the first indication information or the second indication information indicates that the another sidelink device is a sidelink device other than the second sidelink device.

In this embodiment of this application, the first indication information or the second indication information may further indicate a sidelink device to which a resource selected by the first sidelink device from the second resource set can be used to send information, and the first indication information or the second indication information may further indicate a sidelink device to which the first sidelink device can send information on the third resource set. According to an indication of the first indication information or the second indication information, a sidelink device to which the second resource set recommended to the first sidelink device and/or the third resource set scheduled to the first sidelink device can be used to send information may be further identified, to provide a reference for resource selection and optimize the coordination procedure.

In a possible implementation of the sixth aspect, the information about the second resource set recommended to the first sidelink device includes the information about the second resource set recommended by the second sidelink device to the first sidelink device, and the information about the third resource set scheduled to the first sidelink device includes the information about the second resource set scheduled by the second sidelink device to the first sidelink device. The first indication information or the second indication information indicates the first sidelink device to send, on the second resource set and/or the third resource set, data to a sidelink device other than the second sidelink device. The first indication information or the second indication information further indicates whether the second resource set and/or the third resource set include/includes a reserved resource of the second sidelink device, where the reserved resource is used by the second sidelink device to receive or send information.

In a possible implementation of the sixth aspect, the information about the second resource set recommended to the first sidelink device includes the information about the second resource set recommended by the second sidelink device to the first sidelink device, and the information about the third resource set scheduled to the first sidelink device includes the information about the second resource set scheduled by the second sidelink device to the first sidelink device. The first indication information or the second indication information indicates the first sidelink device to send, on the second resource set and/or the third resource set, data to a sidelink device other than the second sidelink device. The transceiver module is further configured to send third indication information, where the third indication information indicates whether the second resource set and/or the third resource set include/includes a reserved resource of the second sidelink device, and the reserved resource is used by the second sidelink device to receive or send information.

In this embodiment of this application, when the first indication information or the second indication information indicates that the second resource set and/or the third resource set are/is used to send information to the sidelink device other than the second sidelink device, the first indication information, the second indication information, or the third indication information may further indicate whether the second resource set and/or the third resource set include/includes a reserved resource of the second sidelink device, where the reserved resource of the second sidelink device is used by the second sidelink device to receive or send information. When the first indication information, the second indication information, or the third indication information indicates that the second resource set and/or the third resource set do/does not include a reserved resource of the second sidelink device, the first sidelink device may select a resource in the second resource set and/or the third resource set to send information.

In a possible implementation of the sixth aspect, the fourth resource set is used to expect, when the first sidelink device determines the first resource set for sending information to another sidelink device, the first sidelink device to exclude some or all resources in the fourth resource set. The first indication information further indicates the another sidelink device. Alternatively, the fourth resource set is used by the first sidelink device to exclude some or all resources in the fourth resource set when determining the first resource set for sending information to another sidelink device. The first indication information further indicates the another sidelink device, and the transceiver module is further configured to send second indication information, where the second indication information indicates the another sidelink device.

In a possible implementation of the sixth aspect, the information about the fourth resource set expected to be excluded by the first sidelink device includes the information about the fourth resource set expected by the second sidelink device to be excluded by the first sidelink device. That the first indication information or the second indication information indicates the another sidelink device includes: The first indication information or the second indication information indicates that the another sidelink device is the second sidelink device, or the first indication information or the second indication information indicates that the another sidelink device is any sidelink device, or the first indication information or the second indication information indicates that the another sidelink device is a sidelink device other than the second sidelink device.

In this embodiment of this application, the first indication information or the second indication information may further indicate a sidelink device, where the first sidelink device may exclude some or all resources in the fourth resource set when determining the first resource set for sending information to the sidelink device. For example, when the first indication information indicates that the first sidelink device selects the first resource set is to send information to the second sidelink device, some or all resources in the fourth resource set should be excluded. If the first sidelink device selects the first resource set to send information to the sidelink device other than the second sidelink device, the first sidelink device may not exclude a resource in the fourth resource set. In this way, resource selection efficiency of the first sidelink device can be improved, and the coordination procedure can be optimized.

In a possible implementation of the sixth aspect, the second resource set is used by the first sidelink device to select the first resource set based on the second resource set and a fifth resource set, and the fifth resource set is a resource set determined by the first sidelink device through monitoring.

In this embodiment of this application, the first sidelink device may select a resource in the first resource set from the recommended second resource set and the fifth resource set monitored by the first sidelink device, to send information. The first sidelink device selects, from the recommended resource set and the resource set monitored by the first sidelink device, the resource used to send the information, so that resource selection accuracy can be improved.

In a possible implementation of the sixth aspect, the information about the fourth resource set expected to be excluded by the first sidelink device includes: the information about the fourth resource set expected by the second sidelink device to be excluded by the first sidelink device. The fourth resource set includes one or more of the following resources: a resource used by the second sidelink device to receive or send information, a reserved resource of the first sidelink device that is preempted by another sidelink device, a resource selected by the second sidelink device from a preconfigured resource pool, a resource determined, by the second sidelink device based on a monitoring result of the second sidelink device, to be reserved by another sidelink device, and a resource determined by the second sidelink device according to an indication of a base station.

In this embodiment of this application, the second sidelink device may determine, in a plurality of manners, a resource, in the fourth resource set, expected to be excluded by the first sidelink device. The resource in the fourth resource set may include one or more of the foregoing plurality of manners. For the reserved resource of the first sidelink device that is preempted by the another sidelink device, the second sidelink device may assist the first sidelink device in performing preemption detection, use a detected preempted resource as a resource in the fourth resource set, send information about the fourth resource set to the first sidelink device by using coordination information, and expect the first sidelink device to exclude the resource. The coordination procedure can be optimized by assisting the first sidelink device in performing preemption detection.

In a possible implementation of the sixth aspect, the information about the second resource set recommended to the first sidelink device includes the information about the second resource set recommended by the second sidelink device to the first sidelink device, and the information about the third resource set scheduled to the first sidelink device includes the information about the third resource set scheduled by the second sidelink device to the first sidelink device. A resource in the second resource set and/or the third resource set includes one or more of the following resources: a resource selected by the second sidelink device based on a monitoring result of the second sidelink device, a resource selected by the second sidelink device from a preconfigured resource pool, and a resource determined by the second sidelink device according to an indication of the base station.

In this embodiment of this application, the second sidelink device may determine the second resource set and/or the third resource set in a plurality of manners, and the resource in the second resource set and/or the third resource set may include one or more of the foregoing plurality of manners. The resource set is recommended or scheduled in a plurality of manners, to improve accuracy of resource recommendation or scheduling and optimize the coordination procedure.

In a possible implementation of the sixth aspect, the processing module is configured to: monitor a plurality of resources in a monitoring time window, and exclude a reserved or occupied resource in a selection time window based on a monitoring result. A resource selected by the processing module based on the monitoring result of the processing module includes some or all remaining resources after the reserved or occupied resource is excluded by the processing module in the selection time window.

In this embodiment of this application, after excluding the reserved or occupied resource based on the monitoring result of the second sidelink device, the second sidelink device may select a resource in the corresponding selection time window as a resource in the second resource set and/or the third resource set and recommend the resource to the first sidelink device.

In a possible implementation of the sixth aspect, that the processing module is configured to exclude the reserved or occupied resource in the selection time window based on the monitoring result includes: The processing module is configured to exclude the reserved or occupied resource in the selection time window based on a priority. The first resource set is used by the first sidelink device to send data to the second sidelink device, and the priority is a third priority. Alternatively, the first resource set is used by the first sidelink device to send data to any sidelink device, and the priority is a fourth priority. Alternatively, the first resource set is used by the first sidelink device to send data to the sidelink device other than the second sidelink device, and the priority is a fifth priority. A relationship between a value of the third priority, a value of the fourth priority, and a value of the fifth priority is: the value of the third priority≤the value of the fourth priority≤the value of the fifth priority.

In this embodiment of this application, a smaller value of the priority indicates more resources excluded based on the priority, less interference to a finally left resource, and better quality. Therefore, when the first resource set is used by the first sidelink device to send data to the second sidelink device, a resource selected by the second sidelink device is expected to have less interference, so that the value of the third priority is smaller. When the first resource set is used by the first sidelink device to send data to the sidelink device other than the second sidelink device, a requirement on an interference degree of a finally left resource is low. Therefore, the value of the fifth priority may be greater than the value of the third priority and the value of the fourth priority.

According to a seventh aspect, a communication apparatus is provided. The communication apparatus may be a second sidelink device, and includes: a transceiver module, configured to receive first indication information and trigger information, where the trigger information is used to trigger a coordination procedure; and a processing module, configured to indicate, based on the first indication information, that the trigger information includes one or more of the following information: third indication information used to identify the trigger information, second indication information indicating content of coordination information, and a trigger parameter used by the second sidelink device to determine the coordination information. The third indication information may be 1 bit. A function of the third indication information is to indicate, to the second sidelink device, that current information is the trigger information, and the second sidelink device triggers the coordination procedure after identifying the trigger information. The second indication information indicates, to the second sidelink device, content that is to be included in the coordination information sent by the second sidelink device to a first sidelink device.

In this embodiment of this application, the first indication information indicates content of the trigger information, to reduce signaling identification complexity and optimize the coordination procedure.

In a possible implementation of the seventh aspect, the content of the coordination information includes one or more of the following information: information about a second resource set recommended to the first sidelink device, information about a third resource set scheduled to the first sidelink device, information about a fourth resource set expected to be excluded by the first sidelink device, a coordination parameter or a measurement result used by the first sidelink device to determine a first resource set, and indication information indicating the first sidelink device to determine the first resource set. The first resource set is used by the first sidelink device to send information on the first resource set.

A meaning of the information about the second resource set recommended to the first sidelink device is: informing, notifying, or indicating the first sidelink device that a resource in the second resource set is a resource that can be selected by the first sidelink device. The first sidelink device may select the resource in the second resource set to send data or control information, or may not select the resource in the second resource set.

A meaning of the information about the third resource set scheduled to the first sidelink device is: informing, notifying, or indicating the first sidelink device to send data or control information by using a resource in the third resource set. The first sidelink device directly uses the resource in the third resource set to send information.

A meaning of the fourth resource set expected to be excluded by the first sidelink device is: The first sidelink device is not recommended to select a resource in the fourth resource set to send information. The first sidelink device may exclude some or all resources in the fourth resource set, or the first sidelink device may not exclude the resource in the fourth resource set.

The coordination parameter or the measurement result may include, for example, measured RSRP, a channel state information (CSI) feedback result, location information, power, a speed, a path loss, and a priority.

The indication information indicating the first sidelink device to determine the first resource set may be indication information for resource retransmission or indication information for resource reselection.

In this embodiment of this application, when the content of the trigger information includes the second indication information and/or the trigger parameter, the second sidelink device may determine, based on the second indication information and/or the trigger parameter, specific content of the coordination information that is to be provided for the first sidelink device, to assist the first sidelink device in resource selection in a targeted manner, and therefore optimize the coordination procedure.

In a possible implementation of the seventh aspect, the trigger parameter includes at least one of the following information: a quantity of sub-channels, a size of a selection window, a size of a monitoring window, a periodicity, or priority information.

According to an eighth aspect, a communication apparatus is provided. The communication apparatus may be a first sidelink device, and includes: a processing module, configured to determine first indication information and trigger information, where the trigger information is used to trigger a coordination procedure, and the first indication information indicates that the trigger information includes one or more of the following information: third indication information used to identify the trigger information, second indication information indicating content of coordination information, and a trigger parameter used by a second sidelink device to determine the coordination information; and a transceiver module, configured to send the first indication information and the trigger information. The third indication information may be 1 bit. A function of the third indication information is to indicate that current information is the trigger information. The second indication information indicates content that is to be included in the coordination information sent to the first sidelink device.

In this embodiment of this application, the first indication information indicates content of the trigger information, to reduce signaling identification complexity and optimize the coordination procedure.

In a possible implementation of the eighth aspect, the content of the coordination information includes one or more of the following information: information about a second resource set recommended to the first sidelink device, information about a third resource set scheduled to the first sidelink device, information about a fourth resource set expected to be excluded by the first sidelink device, a coordination parameter or a measurement result used by the first sidelink device to determine a first resource set, and indication information indicating the first sidelink device to determine the first resource set. The first resource set is used by the first sidelink device to send information on the first resource set.

A meaning of the information about the second resource set recommended to the first sidelink device is: informing, notifying, or indicating the first sidelink device that a resource in the second resource set is a resource that can be selected by the first sidelink device. The first sidelink device may select the resource in the second resource set to send data or control information, or may not select the resource in the second resource set.

A meaning of the information about the third resource set scheduled to the first sidelink device is: informing, notifying, or indicating the first sidelink device to send data or control information by using a resource in the third resource set. The first sidelink device directly uses the resource in the third resource set to send information.

A meaning of the fourth resource set expected to be excluded by the first sidelink device is: The first sidelink device is not recommended to select a resource in the fourth resource set to send information. The first sidelink device may exclude some or all resources in the fourth resource set, or the first sidelink device may not exclude the resource in the fourth resource set.

The coordination parameter or the measurement result may include, for example, measured RSRP, a channel state information (CSI) feedback result, location information, power, a speed, a path loss, and a priority.

The indication information indicating the first sidelink device to determine the first resource set may be indication information for resource retransmission or indication information for resource reselection.

In this embodiment of this application, when the content of the trigger information includes the second indication information and/or the trigger parameter, a sidelink device that receives the trigger information may determine, based on the second indication information and/or the trigger parameter, specific content of the coordination information that is to be provided for the first sidelink device, to assist the first sidelink device in resource selection in a targeted manner, and therefore optimize the coordination procedure.

In a possible implementation of the eighth aspect, the trigger parameter includes at least one of the following information: a quantity of sub-channels, a size of a selection window, a size of a monitoring window, a periodicity, or priority information.

According to a ninth aspect, a computer-readable storage medium is provided, where the computer-readable storage medium includes instructions. When the instructions are run on a computer, the computer is enabled to perform the method according to any possible implementation of the first aspect.

According to a tenth aspect, a computer-readable storage medium is provided, where the computer-readable storage medium includes instructions. When the instructions are run on a computer, the computer is enabled to perform the method according to any possible implementation of the second aspect.

According to an eleventh aspect, a computer-readable storage medium is provided, where the computer-readable storage medium includes instructions. When the instructions are run on a computer, the computer is enabled to perform the method according to any possible implementation of the third aspect.

According to a twelfth aspect, a computer-readable storage medium is provided, where the computer-readable storage medium includes instructions. When the instructions are run on a computer, the computer is enabled to perform the method according to any possible implementation of the fourth aspect.

According to a thirteenth aspect, a communication apparatus is provided. The communication apparatus includes a memory and a processor, the memory is configured to store instructions, the processor is configured to execute the instructions stored in the memory, and execution of the instructions stored in the memory enables the processor to perform the method according to any possible implementation of the first aspect.

According to a fourteenth aspect, a communication apparatus is provided. The communication apparatus includes a memory and a processor, the memory is configured to store instructions, the processor is configured to execute the instructions stored in the memory, and execution of the instructions stored in the memory enables the processor to perform the method according to any possible implementation of the second aspect.

According to a fifteenth aspect, a communication apparatus is provided. The communication apparatus includes a memory and a processor, the memory is configured to store instructions, the processor is configured to execute the instructions stored in the memory, and execution of the instructions stored in the memory enables the processor to perform the method according to any possible implementation of the third aspect.

According to a sixteenth aspect, a communication apparatus is provided. The communication apparatus includes a memory and a processor, the memory is configured to store instructions, the processor is configured to execute the instructions stored in the memory, and execution of the instructions stored in the memory enables the processor to perform the method according to any possible implementation of the fourth aspect.

According to a seventeenth aspect, a communication system is provided. The communication system includes the communication apparatus described in the fifth aspect and the communication apparatus described in the sixth aspect.

According to an eighteenth aspect, a communication system is provided. The communication system includes the communication apparatus described in the seventh aspect and the communication apparatus described in the eighth aspect.

According to a nineteenth aspect, a computer program product including instructions is provided. The computer program product is configured to store a computer program. When the computer program is run on a computer, the computer is enabled to perform the method according to any possible implementation of the first aspect.

According to a twentieth aspect, a computer program product including instructions is provided. The computer program product is configured to store a computer program. When the computer program is run on a computer, the computer is enabled to perform the method according to any possible implementation of the second aspect.

According to a twenty-first aspect, a computer program product including instructions is provided. The computer program product is configured to store a computer program. When the computer program is run on a computer, the computer is enabled to perform the method according to any possible implementation of the third aspect.

According to a twenty-second aspect, a computer program product including instructions is provided. The computer program product is configured to store a computer program. When the computer program is run on a computer, the computer is enabled to perform the method according to any possible implementation of the fourth aspect.

DESCRIPTION OF EMBODIMENTS

Figures 1, 2A:
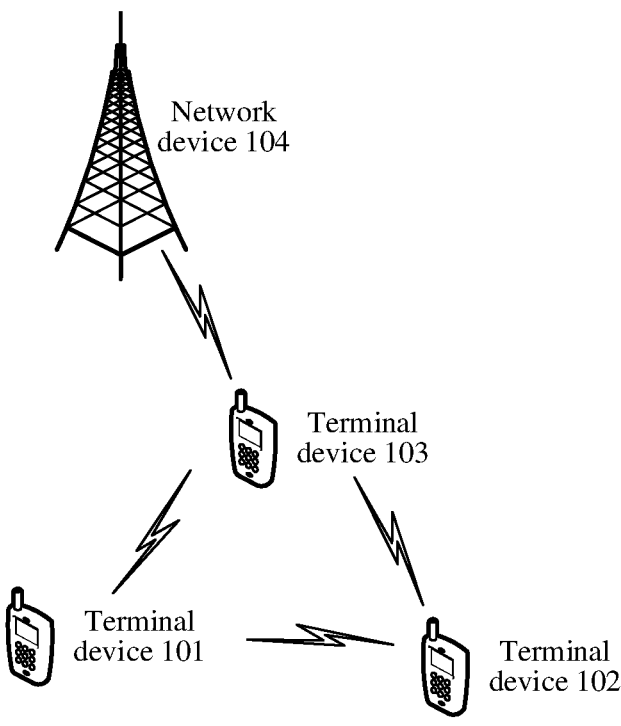
FIG. 1 is a schematic diagram of a communication system to which a communication method according to an embodiment of this application is applicable.
FIG. 2*a* is a schematic diagram of a vehicle-to-vehicle communication system according to an embodiment of this application.

To make objectives, technical solutions, and advantages of embodiments of this application clearer, the following further describes embodiments of this application in detail with reference to the accompanying drawings.

The following describes some terms in embodiments of this application, to facilitate understanding of a person skilled in the art.

1. A Sidelink Device in this Application May be a Terminal Device.

The terminal device may communicate with a core network through a radio access network (RAN). The terminal may include user equipment (UE), a wireless terminal, a mobile terminal, a device-to-device (D2D) communication terminal, a vehicle-to-everything (V2X) terminal, a road side unit (RSU), a machine-to-machine/machine-type communications (M2M/MTC) terminal, an internet of things (IoT) terminal, a subscriber unit, a subscriber station, a mobile station, a remote station, an access point (AP), a remote terminal, an access terminal, a user terminal, a user agent, a user device, or the like. The terminal device may include a mobile phone (or referred to as a "cellular" phone), a computer with a mobile terminal, a portable, pocket-sized, handheld, or computer built-in mobile apparatus, or the like.

By way of example, and not limitation, in embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligent designs of daily wear, such as glasses, gloves, watches, clothes, and shoes. The wearable device is a portable device that is directly worn on a body or integrated into clothes or an accessory of a user. The wearable device is not only a hardware device, but is used to implement a powerful function through software support, data exchange, and cloud interaction. In a broad sense, wearable intelligent devices include full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

However, if the terminals described above are located in a vehicle, for example, placed in the vehicle or mounted in the vehicle, the terminals may be considered as vehicle-mounted terminals. For example, the vehicle-mounted terminals are also referred to as on-board units (OBUs).

In embodiments of this application, an apparatus configured to implement a function of the terminal may be a terminal, or may be a circuit that can support the terminal in implementing the function, for example, a circuit that may be applied to a chip system. The chip system may be installed in the terminal. In embodiments of this application, the chip system may include a chip, or may include a chip and another discrete component. In the technical solutions provided in embodiments of this application, the technical solutions provided in embodiments of this application are described by using an example in which the apparatus configured to implement the function of the terminal is the terminal 2. Sidelink (Sidelink, SL)

In V2X, terminal devices may communicate with each other in two manners. In a first manner, the terminal devices communicate with each other through Uu interfaces. The Uu interface is a wireless interface between the terminal device and a network device, and communication between the terminal devices requires forwarding by a node, for example, the network device. In a second manner, side communication is performed between the terminal devices. In some embodiments, direct communication may be performed between the terminal devices, and forwarding by a network device is not required. In this case, a link for direct connection between the terminal devices is referred to as a sidelink.

Usually, in a sidelink technology, the terminal devices may perform direct information connection through a PC5 interface between the terminal devices. In this application, a sidelink may be represented by a sidelink in English, or may be represented by a side link. Meanings of the sidelink and the side link are the same, and are both English expressions of the sidelink in this application. This technology may not only support information exchange within service coverage of a network device, but also support information exchange in a place without coverage of a network device. A terminal device that is authorized to perform special communication may use a sidelink communication manner. Certainly, sidelink communication may be used to transmit service data of intelligent transportation, or may be used to transmit a mobile internet service. This is not limited in this application.

3. Sidelink Control Information (SCI)

The sidelink control information includes sidelink scheduling information or indication information used for sidelink transmission, for example, indication information of a time-frequency resource block used during transmission, a modulation and coding scheme, a source identifier ID, and a target identifier ID. In NR, sidelink control information of V2X is sent in two stages. First stage SCI is carried on a physical sidelink control channel (PSCCH) and includes information for monitoring and information related to PSSCH resource allocation. The first stage SCI may also be referred to as first-level SCI.

Second stage SCI is carried on a physical sidelink shared channel (PSSCH), and the second stage SCI carries information required for identifying and/or decoding an associated sidelink shared channel (SL-SCH), indication information of a hybrid automatic repeat request (HARQ), trigger information of channel state information (CSI) feedback, and the like. The second stage SCI may also be referred to as second-level SCI.

4. Mode (Mode-2) of Autonomously Selecting a Resource by a User

In V2X, there are two transmission modes related to sidelink resource allocation. One is a mode (mode-1) of allocating a resource by a network device, and the other is the mode (mode-2) of autonomously selecting a resource by a user. The mode of allocating a resource by a network device is mainly applied to V2X communication in a case in which there is network coverage. The network device performs centralized resource allocation based on reporting statuses of buffer status reports (BSRs) of terminal devices. Resources can be allocated in a dynamic mode or a preconfiguration mode. A resource allocated by the network device includes an initial resource and/or a retransmission resource.

In the dynamic mode, the network device notifies, by using downlink control information (DCI), a sending terminal device of a time-frequency resource of sidelink data, and the sending terminal device sends the data after receiving the DCI. After decoding, a receiving terminal device feeds back sidelink hybrid automatic repeat request (HARQ) information to the sending terminal device. Then, the sending terminal device forwards the sidelink-HARQ information to a base station.

The mode (mode-2) of autonomously selecting a resource by a user may be further divided into four sub-modes:

(1) mode-2(a): A sending terminal device autonomously selects a transmission resource for communication. In some embodiments, the sending terminal device selects the transmission resource from remaining resources after excluding a reserved resource from a resource pool based on historical monitoring information, where the monitoring information includes the resource that has been reserved by another terminal device, and sends sidelink data after selecting the transmission resource.

(2) mode-2(b): A transmission resource of a sending terminal device is selected in coordination of another terminal device.

(3) mode-2(c): A transmission resource of a sending terminal device is selected from a resource preconfigured by using higher layer signaling.

(4) mode-2(d): A plurality of terminal devices first perform a group establishment operation, where one terminal device in a group is a scheduling terminal device, and another terminal device is a member terminal device. The scheduling terminal device is responsible for a transmission resource of the member terminal device.

In the mode-2(a), the sending terminal device autonomously selects, in a resource selection window based on a resource monitoring result of the sending terminal device, the transmission resource for communication. It is assumed that the sending terminal device triggers resource selection in a slot n. In this case, a resource monitoring window may be defined as T slots before the resource selection is triggered.

5. Slot (Time Slot)

In an NR system, a slot is a minimum scheduling unit of time. Time is divided into periodical frames, and each frame is divided into several slots. The frames or the slots do not overlap with each other. Each slot is a basic unit of communication. Duration of the slot is determined based on a subcarrier spacing used during transmission. For example, for a 15 kHz subcarrier spacing, duration of one slot may be 1 ms. For another example, for a 30 kHz subcarrier spacing, duration of one slot may be 0.5 ms. For still another example, for a 60 kHz subcarrier spacing, duration of one slot may be 0.25 ms. For yet another example, for a 120 kHz subcarrier spacing, duration of one slot may be 0.125 ms. Optionally, when a slot is used as a basic scheduling unit, all symbols in the slot may be used for transmission, or some symbols in the slot may be used for transmission. This is not limited in the present description. For example, a quantity of symbols in a slot may be 12 or 14. In an example of 14 symbols, the last symbol may be a symbol used for receiving/transmitting conversion. In this case, only 13 symbols are used for sidelink transmission.

6. The technical solutions in embodiments of this application may be applied to various communication systems, for example, an LTE system, a worldwide interoperability for microwave access (WiMAX) communication system, a 5th generation (5G) system such as an NR system, and a future communication system such as a 6G system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

A network architecture and a service scenario described in embodiments of this application are intended to describe the technical solutions in embodiments of this application more clearly, and do not constitute a limitation on the technical solutions provided in embodiments of this application. A person of ordinary skill in the art may know: With evolution of the network architecture and emergence of new service scenarios, the technical solutions provided in embodiments of this application are also applicable to similar technical problems.

For ease of understanding embodiments of this application, a communication system shown in FIG. 1 is first used as an example to describe in detail a communication system to which embodiments of this application are applicable. FIG. 1 is a schematic diagram of the communication system to which a communication method according to an embodiment of this application is applicable. As shown in FIG. 1, the communication system 100 includes a plurality of terminal devices, for example, a terminal device 101 to a terminal device 103. The terminal device 101, a terminal device 102, and the terminal device 103 may directly communicate with each other. For example, the terminal device 101 and the terminal device 102 may separately or simultaneously send data to the terminal device 103. The wireless communication device further includes one or more network devices, for example, a network device 104 in FIG. 1. All the terminal devices 101 to 103 may communicate with the network device 104. For example, in FIG. 1, the network device 104 communicates with the terminal device 103.

FIG. 1 shows only the terminal device 101, the terminal device 102, the terminal device 103, and the network device 104 as an example for ease of understanding. However, this does not constitute any limitation on this application. The wireless communication system may further include more network devices, or may include more or fewer terminal devices. This is not limited in this application.

Figure 2B:
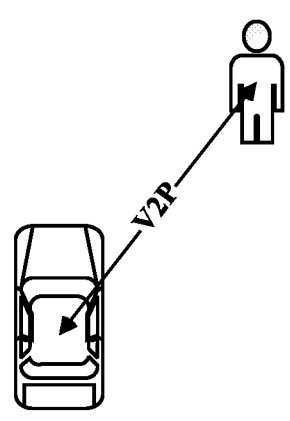
FIG. 2*b* is a schematic diagram of a vehicle-to-pedestrian communication system according to an embodiment of this application.
Figure 2C:
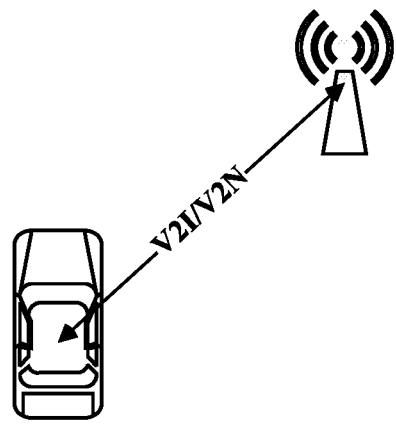
FIG. 2*c* is a schematic diagram of a vehicle-to-infrastructure communication system or a vehicle-to-network communication system according to an embodiment of this application.

FIG. 2a to FIG. 2c are schematic diagrams of another communication system to which an embodiment of this application is applicable. FIG. 2a to FIG. 2c are schematic diagrams of a vehicle-to-everything (V2X) communication system. V2X communication is specific to a high-speed device represented by a vehicle, and is a basic technology and a key technology applied in a scenario with a very high communication delay requirement in the future, for example, an intelligent vehicle, self-driving, or an intelligent transportation system. V2X includes vehicle-to-vehicle (V2V) communication shown in FIG. 2a, vehicle-to-pedestrian (V2P) communication shown in FIG. 2b, and vehicle-to-infrastructure (V2I) communication or vehicle-to-network (V2N) communication shown in FIG. 2c.

The following describes related technical content in embodiments of this application with reference to the accompanying drawings.

1. A process in which a terminal device selects a resource based on a monitoring result of the terminal device.

The terminal that selects the resource based on the monitoring result of the terminal may also be referred to as a monitoring terminal. The monitoring terminal continuously monitors, in a monitoring time window, all remaining slots, in all slots that belong to a sidelink resource pool, other than a slot in which the monitoring terminal has performed transmission. Then, the monitoring terminal excludes, in a selection time window based on a monitoring result, a resource that has been reserved by another terminal and/or a resource expected by a coordinating terminal to be excluded by a sending terminal.

$$\left( t_0^{SL}, t_1^{SL}, t_2^{SL}, \dots \right)$$

is defined as a set of slots that belong to the sidelink resource pool. A specific resource exclusion procedure is as follows:

(1) A resource selection window is defined as a slot corresponding to $[n+T_1, n+T_2]$ after resource selection is triggered. It is assumed that a quantity of subchannels included in a frequency domain resource of the sidelink resource pool is $N_{subCH}$, and a corresponding set of subchannels is $S=\{S_0, S_1, \dots, S_{N_{subCH}-1}\}$. A candidate resource $R_{x,y}$ is defined as a slot $$t_y^{SL}$$

that belongs to the sidelink resource pool and that is located in the resource selection window $[n+T_1, n+T_2]$ in time domain, and a set of subchannels starting from subchannels $x+j$ in frequency domain. $j=0, \dots, L_{subCH}-1$, in other words, the candidate resource is represented in frequency domain as a set of consecutive subchannels whose lengths are equal to $L_{subCH}$. $L_{subCH}$ is a quantity of subchannels occupied by a PSSCH and a PSCCH corresponding to to-be-transmitted data. Therefore, a total quantity of candidate resources in each slot is $N_{subCH}-L_{subCH}+1$. Any set of consecutive subchannels whose lengths are equal to $L_{subCH}$ is considered as a candidate resource $R_{x,y}$, and a quantity of all candidate resources is $M_{total}$.

For example, a maximum quantity $N_{subCH}$ of subchannels in a frequency domain resource pool may be 8, a corresponding set of subchannels is $S=\{S_0, S_1, \dots, S_7\}$, and a quantity $L_{subCH}$ of subchannels occupied by a PSSCH corresponding to to-be-transmitted data is 2. In this case, a total quantity of candidate resources in each slot is $N_{subCH}-L_{subCH}+1=7$.

(2) A resource monitoring window may be defined as $$\left[ n - T_0, n - T_{proc,0}^{SL} \right),$$

and the resource monitoring window may also be referred to as a monitoring time window. To is configured by using a higher layer parameter sl_SensingWindow, and $$T_{proc,0}^{SL}$$

is determined based on Table 1. $\mu_{SL}$ is a subcarrier spacing (SCS) configuration corresponding to a sidelink bandwidth part, and a relationship between $\mu_{SL}$ and a subcarrier spacing is determined based on Table 2.

TABLE 1

| $\mu_{SL}$ | $T_{proc,0}^{SL}$ [slots] |
|---|---|
| 0 | 1 |
| 1 | 1 |
| 2 | 2 |
| 3 | 4 |

TABLE 2

| Relationship between $\mu_{SL}$ and a subcarrier spacing | |
|---|---|
| $\mu_{SL}$ | $\Delta f = 2^\mu \cdot 15$ [kHz] |
| 0 | 15 |
| 1 | 30 |
| 2 | 60 |
| 3 | 120 |
| 4 | 240 |

(3) A threshold $Th_{prioTX,prioRX}$ is defined as a function of a priority corresponding to data indicated in received SCI and a priority corresponding to the to-be-sent data of the sending terminal.

(4) It is defined that a set including all $M_{total}$ candidate resources is $S_A$.

(5) If the candidate resource $R_{x,y}$ meets both of the following conditions, the candidate resource $R_{x,y}$ should be excluded from the set $S_A$:

The sending terminal does not monitor a slot $$t_m^{SL},$$

in other words, the sending terminal has performed transmission in the slot $$t_m^{SL}.$$

There is an integer j that satisfies $$y + j \times P'_{rsvp\_TX} = m + q \times P'_{rsvp\_RX},$$

where $$q = 1, 2, \ldots, Q, j = 0, 1, \ldots, C_{resel} - 1, P'_{rsvp\_TX}$$

is a logical periodicity corresponding to a resource reservation periodicity (unit: millisecond, indicating that the periodicity is a physical periodicity) $P_{rsvp_{TX}}$ of the sending terminal, $$P'_{rsvp\_RX}$$

is a logical periodicity (including only a slot in the sidelink resource pool) corresponding to all physical periodicities $P_{rsvp_{RX}}$ indicated by a higher layer parameter sl-ResourceReservePeriodList. If $$P_{rsvp\_RX} < T_{scal} \text{ and } n' - m \leq P'_{rsvp\_RX},$$

$$Q = \left\lceil \frac{T_{scal}}{P_{rsvp\_RX}} \right\rceil.$$

Otherwise, Q=1. If a slot n belongs to the sidelink resource pool, $$t_{n'}^{SL} = n.$$

Otherwise, $$t_{n'}^{SL}$$

is the first slot belonging to the sidelink resource pool after the slot n. $T_{scal}$ is an interval corresponding to a length $T_2$ of the resource selection window, and a unit is ms.

(6) If the candidate resource $R_{x,y}$ meets all of the following conditions, the candidate resource $R_{x,y}$ should be excluded from the set $S_A$:

The sending terminal receives SCI in a slot $$t_m^{SL},$$

and decodes $P_{rsvp\_RX}$ (when a field "resource reservation period" exists) and $prio_{RX}$, where $P_{rsvp\_RX}$ and $prio_{RX}$ are a physical periodicity and a priority that correspond to a PSSCH corresponding to the SCI.

An RSRP measurement result of the PSSCH or a PSCCH determined based on the SCI is higher than a threshold $Th_{prioTX,prioRX}$, where the threshold $Th_{prioTX,prioRX}$ is a function of a priority corresponding to data indicated in the received SCI and a priority corresponding to to-be-sent data of sending UE.

When a field "resource reservation period" exists, it is expected, based on a time-frequency resource determined based on the SCI received in the slot $$t_m^{SL},$$

that a time-frequency resource determined based on SCI received in a slot $$t_{m+q \times P'_{rsvp\_RX}}^{SL}$$

overlaps a candidate resource $$R_{x,y+j \times P'_{rsvp\_TX}}.$$

Herein, $$q = 1, 2, \ldots, Q, j = 0, 1, \ldots, C_{resel} - 1, P'_{rsvp\_TX}$$

is a logical periodicity corresponding to a resource reservation periodicity (unit: millisecond, indicating that the periodicity is a physical periodicity) $P_{rsvp_{TX}}$ of the sending UE, and $$P'_{rsvp\_RX},$$

is a logical periodicity (including only a slot in the sidelink resource pool) corresponding to a physical periodicity $P_{rsvp_{RX}}$ indicated by the received SCI. If $P_{rsvp\_RX} \leq T_{scal}$, and $$n' - m \leq P'_{rsvp\_RX},$$

$$Q = \left\lceil \frac{T_{scal}}{P_{rsvp\_RX}} \right\rceil.$$

Otherwise, Q=1. If a slot n belongs to the sidelink resource pool, $$t_{n'}^{SL} = n.$$

Otherwise, $$t_{n'}^{SL}$$

is the first slot belonging to the sidelink resource pool after the slot n. $T_{scal}$ is an interval corresponding to a length $T_2$ of the resource selection window, and a unit is ms.

(7) If a quantity of remaining candidate resources in the candidate resource set $S_A$ is less than $M_{total}*X$, the preset reference signal received power (reference signal received power, RSRP) threshold $Th_{prioTX,prioRX}$ is increased by 3 dB, and step (4) to step (6) are repeated, where a configuration of X may be selected from 0.20, 0.35, and 0.50.

Figure 7:
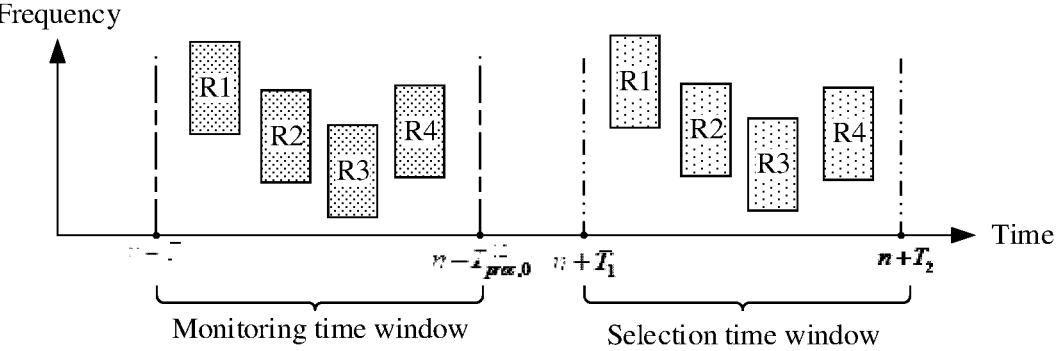
FIG. 7 is a schematic diagram of a resource monitoring process according to an embodiment of this application.

FIG. 7 is a schematic diagram of a resource monitoring process according to an embodiment of this application. As shown in FIG. 7, a terminal device monitors, in a monitoring time window, a resource in the monitoring time window. For example, the monitoring time window is $$[n - T_0, n - T_{proc,0}^{SL}),$$

and a resource selection time window includes four resources R1 to R4. After monitoring, it is determined that R1 and R2 need to be excluded, and the terminal device selects, in the selection time window based on a monitoring result, the corresponding resources R3 and R4 as candidate resources. The selection time window is [n+$T_1$, n+$T_2$].

The monitoring terminal reports a candidate resource set $S_A$ to a higher layer, and then the higher layer completes final resource selection from the set $S_A$.

2. Coordination Procedure

First, the coordination procedure provided in embodiments of this application is described. The coordination procedure is a process in which one communication device assists another communication device in selecting a resource. The coordination procedure provided in embodiments of this application may include two modes: a trigger/request-based coordination mechanism and a non-trigger/non-request-based coordination mechanism. In embodiments of this application, in the following descriptions, a trigger-based coordination mechanism may also be referred to as a request-based coordination mechanism, and a non-trigger-based coordination mechanism may also be referred to as a non-request-based coordination mechanism. Trigger-Based Coordination Mechanism:

The trigger-based coordination mechanism means that a sending terminal sends trigger information to a coordinating terminal, where the trigger information is used to trigger a coordination procedure. The coordination procedure is a procedure in which the coordinating terminal assists the sending terminal in selecting a resource. The coordinating terminal sends coordination information to the sending terminal based on the received trigger information, and the sending terminal selects a resource based on the coordination information.

Figure 3:
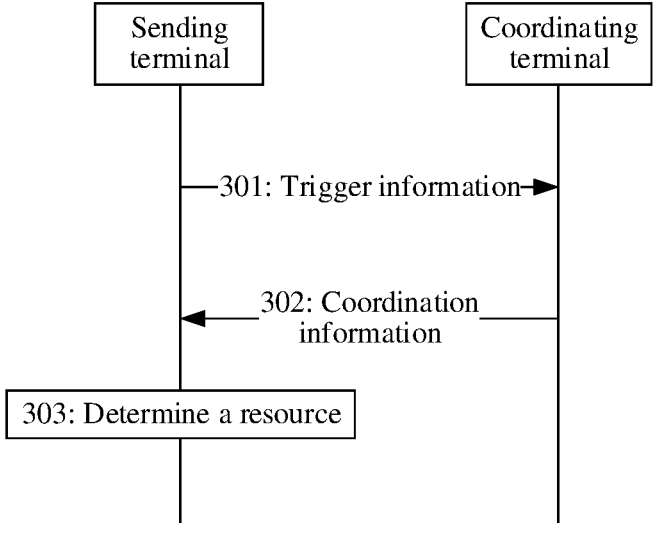
FIG. 3 is a flowchart of a trigger-based coordination mechanism according to an embodiment of this application.
Figure 4:
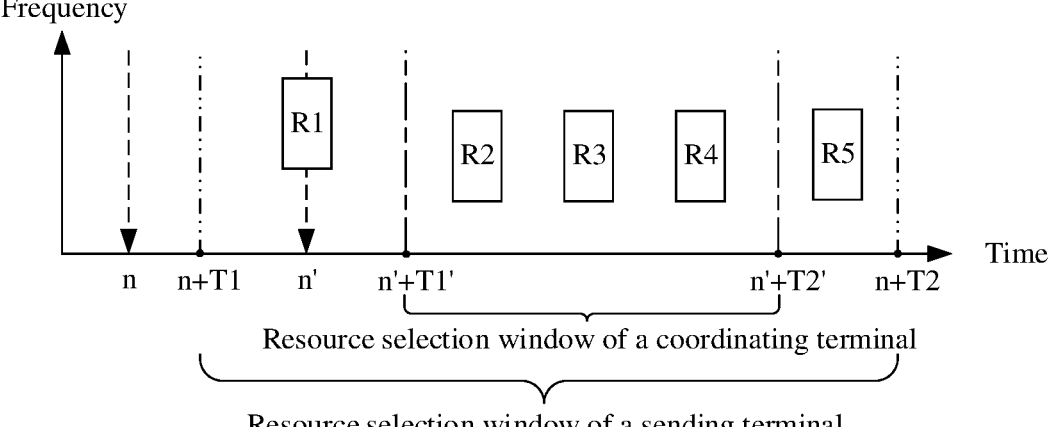
FIG. 4 is a time sequence diagram of a trigger-based coordination mechanism according to an embodiment of this application.

FIG. 3 is a flowchart of a trigger-based coordination mechanism according to an embodiment of this application. FIG. 4 is a time sequence diagram of a trigger-based coordination mechanism according to an embodiment of this application. Descriptions of the trigger-based coordination mechanism in FIG. 3 and FIG. 4 are merely examples. Parameters, quantities of resources, time window lengths, and the like shown in FIG. 3 and FIG. 4 may change. A solution that is based on an idea the same as that in FIG. 3 or FIG. 4 also belongs to the trigger-based coordination mechanism in embodiments of this application. In FIG. 4, a horizontal coordinate is time, a vertical coordinate is a frequency, and R1, R2, R3, R4 and R5 each represent a time-frequency resource including time and a frequency. The sending terminal starts a coordination procedure in a slot n, and sends trigger information in a slot n' to trigger the coordination procedure. [n+T1, n+T2] is a resource selection window of the sending terminal, and T2−T1 is a time length of the resource selection window of the sending terminal. [n'+T1', n'+T2'] is a resource selection window of the coordinating terminal, and T2'−T1' is a time length of the resource selection window of the coordinating terminal. The resource selection window is used by the terminal device to select a resource. As shown in FIG. 3 and FIG. 4, the trigger-based coordination mechanism includes the following steps.

301: The sending terminal sends the trigger information to the coordinating terminal.

After starting the coordination procedure, the sending terminal first selects, in the resource selection window [n+T1, n+T2] based on a historical monitoring result of the sending terminal, a resource (R1) for sending the trigger information to the coordinating terminal, where the resource is located in the slot n'. T1 may be set in consideration of processing time required for determining the resource selection window after the sending terminal starts the coordination procedure. The resource selection window of the sending terminal has two functions. One function is to send the trigger information for selecting a resource, and the other function is to autonomously select a resource as a candidate resource for data transmission. For example, the sending terminal may autonomously select the resources R4 and R5. The candidate resource also includes an available resource or an excluded resource.

302: The coordinating terminal sends coordination information to the sending terminal.

After receiving, in the slot n', the trigger information sent by the sending terminal, the coordinating terminal selects a resource (R2) in the resource selection window [n'+T1', n'+T2'] based on a historical monitoring result of the coordinating terminal, where the resource is used to send the coordination information to the sending terminal. In addition, the coordinating terminal further selects resources (R3 and R4) for the sending terminal based on the historical monitoring result of the coordinating terminal, and sends the resources to the sending terminal for data transmission. The coordination information may include information about a resource recommended, scheduled, or excluded by the coordinating terminal, or other information that can be used to assist the sending terminal in selecting a resource. Herein, an example in which R3 and R4 are resources recommended by the coordinating terminal to the sending terminal for use is used for description. T1' indicates processing time required by the coordinating terminal to select a resource based on the trigger information after receiving the trigger information.

303: The sending terminal determines a resource.

After receiving the coordination information sent by the coordinating terminal, the sending terminal determines a final resource (R4) based on the resources (R3 and R4) recommended by the coordinating terminal to the sending terminal and resources (R4 and R5) selected by the sending terminal based on the historical monitoring result of the sending terminal, and performs data transmission or control signaling transmission on the final resource (R4).

Non-Trigger-Based Coordination Mechanism:

The non-trigger-based coordination mechanism means that a coordinating terminal autonomously sends coordination information to a sending terminal, to assist the sending terminal in selecting a resource. In this mechanism, when the coordinating terminal meets a predefined or preconfigured condition, the coordinating terminal sends the coordination information to the sending terminal. The foregoing condition may also be considered as a trigger condition for sending the coordination message. The sending terminal in this mechanism may not send trigger information to the coordinating terminal.

Figure 5:
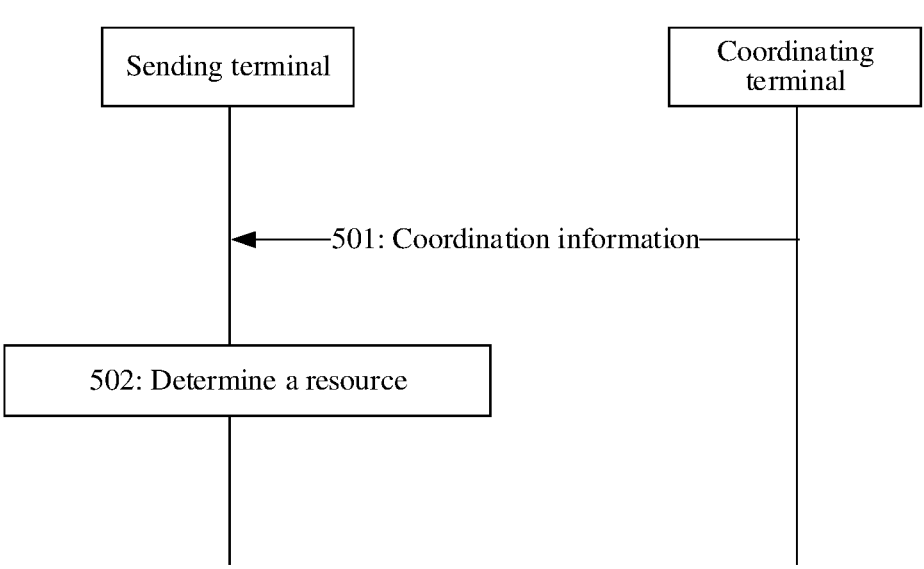
FIG. 5 is a flowchart of a non-trigger-based coordination mechanism according to an embodiment of this application.
Figure 6:
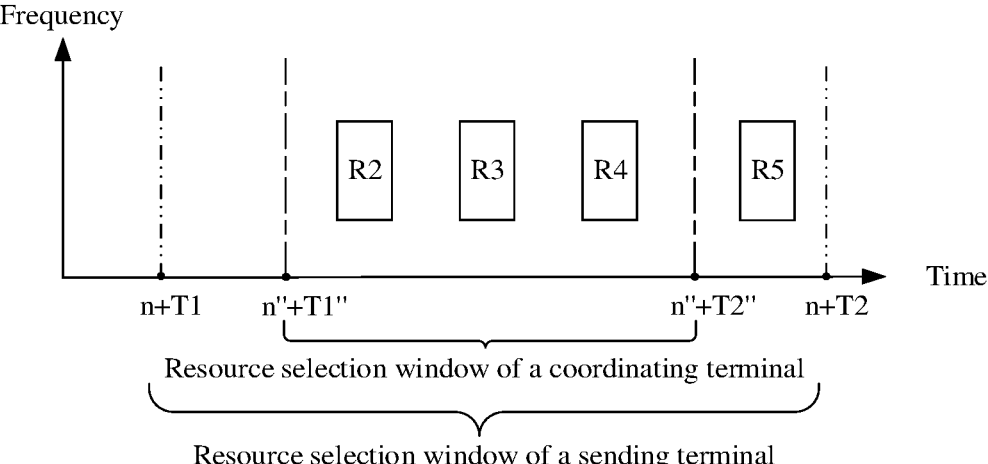
FIG. 6 is a time sequence diagram of a non-trigger-based coordination mechanism according to an embodiment of this application.

FIG. 5 is a flowchart of a non-trigger-based coordination mechanism according to an embodiment of this application. FIG. 6 is a time sequence diagram of a non-trigger-based coordination mechanism according to an embodiment of this application. Descriptions of the non-trigger-based coordination mechanism in FIG. 5 and FIG. 6 are merely examples. Parameters, quantities of resources, time window lengths, and the like shown in FIG. 5 and FIG. 6 may change. A solution that is based on an idea the same as that in FIG. 5 or FIG. 6 also belongs to the non-trigger-based coordination mechanism in embodiments of this application. In FIG. 5, a horizontal coordinate is time, a vertical coordinate is a frequency, and R2 to R5 each represent a time-frequency resource including time and a frequency. [n+T1, n+T2] is a resource selection window of the sending terminal, and T2-T1 is a time length of the resource selection window of the sending terminal. [n"+T1", n"+T2"] is a resource selection window of the coordinating terminal, and T2"−T1" is a time length of the resource selection window of the coordinating terminal. The resource selection window is used by the terminal device to select a resource. As shown in FIG. 5 and FIG. 6, for the non-trigger-based coordination mechanism, the coordinating terminal autonomously triggers resource selection, and the non-trigger-based coordination mechanism includes the following steps.

501: The coordinating terminal sends coordination information to the sending terminal.

The coordinating terminal selects a resource (R2) in the resource selection window [n"+T1", n"+T2"] based on a historical monitoring result of the coordinating terminal, where the resource is used to send the coordination information to the sending terminal. In addition, the coordinating terminal further selects resources (R3 and R4) for the sending terminal based on the historical monitoring result of the coordinating terminal, and recommends the resources to the sending terminal for data transmission. A resource recommended by the coordinating terminal to the sending terminal includes: a resource recommended by the coordinating terminal to the sending terminal for use or a resource excluded by the coordinating terminal for the sending terminal. The excluded resource is a resource that is not recommended to be used by the sending terminal. Herein, an example in which R3 and R4 are resources recommended by the coordinating terminal to the sending terminal for use is used for description.

502: The sending terminal determines a resource.

After receiving the coordination information sent by the coordinating terminal, the sending terminal determines a final resource (R4) based on the resources (R3 and R4) recommended by the coordinating terminal to the sending terminal and resources (R4 and R5) selected by the sending terminal based on a historical monitoring result of the sending terminal, and performs data transmission or control signaling transmission on the final resource (R4).

The following generally describes the technical solutions provided in embodiments of this application. It should be noted that this is merely intended to better understand a core idea of the technical solutions in embodiments of this application, and does not constitute a limitation on embodiments of this application.

Embodiments of this application provide a communication method and a communication apparatus, to indicate a type of coordination information or trigger information, so as to reduce signaling identification complexity, and therefore optimize a coordination procedure. For example, the communication method provided in embodiments of this application may include two possible solutions. For ease of description, the two solutions are referred to as a solution 1 and a solution 2.

In the solution 1, a sidelink device may receive coordination information from another sidelink device, where the coordination information is used by a first sidelink device to determine a first resource set based on the coordination information, and the first resource set is used by the first sidelink device to send information on the first resource set, in other words, the first resource set is used for PSSCH or PSCCH transmission. The sidelink device determines that the coordination information includes one or more of the following information: information about a second resource set recommended to the first sidelink device, information about a third resource set scheduled to the first sidelink device, information about a fourth resource set expected to be excluded by the first sidelink device, a coordination parameter or a measurement result used by the first sidelink device to determine the first resource set, and indication information indicating the first sidelink device to determine the first resource set. In the solution 1, the sidelink device that receives the coordination information can identify content of the coordination information, and therefore can perform a coordination procedure based on the identified content of the coordination information, to optimize the coordination procedure.

In the solution 2, a second sidelink device receives first indication information and trigger information that are sent by a first sidelink device, and the second sidelink device may determine, based on the first indication information, that the trigger information includes one or more of the following information: third indication information, second indication information, or a trigger parameter. The third indication information is used to identify the trigger information, the second indication information indicates content of coordination information, and the trigger parameter is used by the second sidelink device to determine the coordination information. Content of the trigger information is indicated, to reduce complexity of identifying the trigger information by the first sidelink device and optimize a coordination procedure.

The following describes the technical solutions provided in embodiments of this application with reference to Embodiment 1 to Embodiment 3. Embodiment 1 and Embodiment 2 are possible implementations of the communication method described in the solution 1, and Embodiment 3 is a possible implementation of the communication method described in the solution 2. Technical solutions in Embodiment 1 to Embodiment 3 are generally described first. It may be understood that this is merely for ease of understanding the technical solutions in embodiments of this application, and does not constitute a limitation on the protection scope of embodiments of this application.

In Embodiment 1, a first sidelink device receives first indication information and coordination information from a second sidelink device. The first sidelink device may determine content of the coordination information based on the first indication information, and indicate the coordination information by using the first indication information, to reduce signaling identification complexity. The first indication information and the coordination information may be in a same piece of signaling or different pieces of signaling. For example, the first indication information and the coordination information may be carried in a same piece of SCI. Alternatively, the first indication information is carried in first-level SCI, and the coordination information is carried in corresponding second-level SCI.

In Embodiment 2, a third sidelink device receives coordination information from a second sidelink device. The coordination information is used to assist a first sidelink device in selecting a resource. The third sidelink device receives the coordination information, and may also select a resource with reference to the coordination information. The third sidelink device may exclude, from a resource set monitored by the third sidelink device, some or all resources in a resource set that is recommended by the second sidelink device to the first sidelink device, scheduled by the second sidelink device to the first sidelink device, or expected to be excluded by the first sidelink device and that is in the coordination information.

In Embodiment 3, a second sidelink device receives first indication information and trigger information from a first sidelink device, where the first indication information indicates content of the trigger information. The content of the trigger information is indicated by using the first indication information, to reduce signaling identification complexity.

The following describes Embodiment 1 to Embodiment 3 in detail with reference to the accompanying drawings.

Embodiment 1

Figure 8:
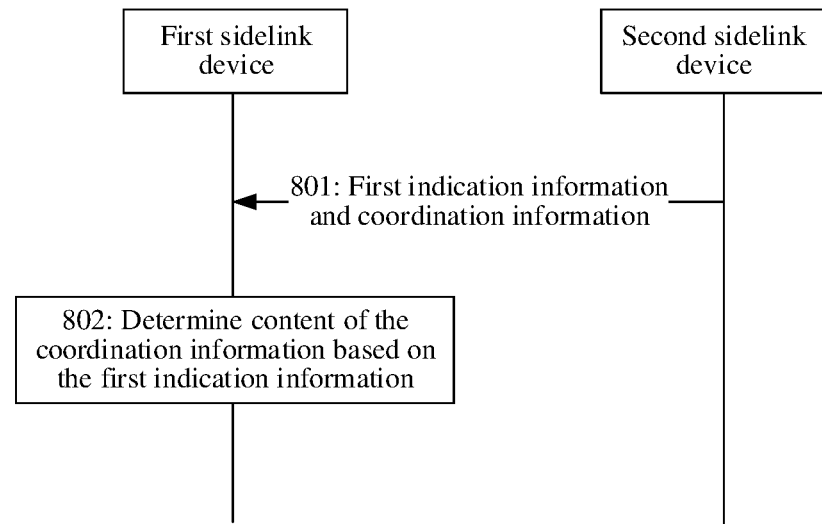
FIG. 8 is a flowchart of a communication method according to Embodiment 1 of this application.

Embodiment 1 is a possible implementation of the communication method described in the solution 1. FIG. 8 is a flowchart of a communication method according to Embodiment 1 of this application. The method includes the following steps.

801: A first sidelink device receives coordination information and first indication information from a second sidelink device.

In this embodiment of this application, a sidelink transmission technology is used as an example. In a sidelink transmission scenario, the first sidelink device and the second sidelink device may be devices of a same type. For example, the first sidelink device and the second sidelink device may be terminal devices. In an example in which both the first sidelink device and the second sidelink device are terminal devices, the first sidelink device may be an OBU and the second sidelink device may be a terminal-type RSU, or the first sidelink device is a terminal-type RSU and the second sidelink device is an OBU. Alternatively, the first sidelink device and the second sidelink device may be network devices.

The coordination information in this embodiment of this application may be coordination information in the foregoing coordination procedure. The coordination information may be the coordination information in step 302 in FIG. 3. In this case, the coordination information is coordination information in a trigger-based coordination mechanism. Alternatively, the coordination information may be the coordination information in step 501 in FIG. 5. In this case, the coordination information is coordination information in a non-trigger-based coordination mechanism. A coordination procedure in this embodiment of this application is a process of coordinately selecting a resource, including a trigger-based coordination mechanism and a non-trigger-based coordination mechanism.

The first indication information and the coordination information may be determined by the second sidelink device, or may be indicated by a network device to the second sidelink device by using downlink control information (DCI), or may be configured by the network device for the second sidelink device by using radio resource control (RRC), or may be preconfigured.

In the sidelink transmission scenario, sidelink devices may transmit sidelink scheduling information or indication information for sidelink transmission with each other by using SCI, and the first indication information and the coordination information may be in SCI. The SCI includes first-level sidelink control information and second-level sidelink control information that may be respectively written as first-level SCI and second-level SCI.

The first indication information and the coordination information may be carried in the following manners:

Manner 1: The first indication information and the coordination information are carried in SCI of a same level.

In the manner 1, both the first indication information and the coordination information may be carried in the first-level SCI, or both the first indication information and the coordination information may be carried in the second-level SCI. In this case, the first indication information may be carried in an identifier field of the first-level SCI or the second-level SCI, and indicates different content by using a value of the identifier field.

Manner 2: The first indication information and the coordination information are carried in different pieces of SCI.

In the manner 2, the first indication information is carried in a reserved field in the first-level SCI. The first indication information may alternatively be carried in a second-level sidelink control information format field 2nd-stage SCI format. When the reserved field or the second-level sidelink control information format field has different values, the first indication information may indicate different content. The coordination information is carried in the second-level SCI.

Manner 3: It is determined, based on content of the coordination information, locations for carrying the first indication information and the coordination information.

When the content of the coordination information includes one or more of information about a second resource set recommended to the first sidelink device, information about a third resource set scheduled to the first sidelink device, or information about a fourth resource set expected to be excluded by the first sidelink device, a location for carrying the coordination information may be set based on a quantity of resources. In an optional implementation, when a quantity of recommended, scheduled, or expected-to-be-excluded resources is less than or equal to a quantity of resources that can be indicated and that is supported by sl-MaxNumPerReserve, the coordination information may be carried in the first-level SCI, and information about a related resource is indicated by using a field in the first-level SCI. When a quantity of recommended, scheduled, or expected-to-be-excluded resources is greater than or equal to a quantity of resources that can be indicated and that is supported by sl-MaxNumPerReserve, the coordination information may be carried in the second-level SCI or a media access control control element (MAC CE), and information about a related resource is indicated by using a field in the second-level SCI or the MAC CE. sl-MaxNumPer-Reserve indicates a maximum quantity of PSSCH/PSCCH resources that can be indicated by time-frequency resource assignment fields in SCI: time resource assignment and frequency resource assignment. sl-MaxNumPerReserve may be preconfigured in the first sidelink device, or may be sent by the network device to the first sidelink device by using configuration signaling. The configuration signaling may be a system information block SIB, radio resource control RRC signaling, or physical layer control information.

When the content of the coordination information includes one or more of information about a second resource set recommended to the first sidelink device, information about a third resource set scheduled to the first sidelink device, or information about a fourth resource set expected to be excluded by the first sidelink device, a related resource may be indicated in a bitmap manner. In this case, the first indication information may be a bitmap. For example, the bitmap may be a digital matrix including a value 0 or 1, where 1 indicates that the resource is a resource in the second resource set recommended to the first sidelink device, and 0 indicates that the resource is a resource in the fourth resource set expected to be excluded by the first sidelink device. For another example, the bitmap may be a digital matrix including a value 0, 1, or 2, where 0 indicates that the resource is a resource in the second resource set recommended to the first sidelink device, 1 indicates that the resource is a resource in the third resource set scheduled to the first sidelink device, and 2 indicates that the resource is a resource in the fourth resource set expected to be excluded by the first sidelink device.

The first sidelink device determines a first resource set based on the coordination information, and the first resource set is used by the first sidelink device to send information on the first resource set. The first resource set is a resource set that is finally selected by the first sidelink device and that is used to send data or control information. In other words, the first resource set is a resource set that is finally selected by the first sidelink device and that is used for PSSCH or PSCCH transmission. The first resource set includes at least one candidate resource.

802: The first sidelink device determines the content of the coordination information based on the first indication information.

The coordination information may be information received by the first sidelink device from the second sidelink device, the coordination information is used to assist the first sidelink device in selecting a resource, the first sidelink device selects a resource with reference to the coordination information, and the first sidelink device may send data or control signaling on the selected resource.

In Embodiment 1 of this application, the first sidelink device may determine, based on the first indication information, that the coordination information includes one or more of the following information: the information about the second resource set recommended to the first sidelink device, the information about the third resource set scheduled to the first sidelink device, the information about the fourth resource set expected to be excluded by the first sidelink device, a coordination parameter or a measurement result used by the first sidelink device to determine the first resource set, and indication information indicating the first sidelink device to determine the first resource set.

The information about the second resource set recommended to the first sidelink device may be recommended by the second sidelink device to the first sidelink device. A meaning of "recommended" may be: The second sidelink device informs, notifies, or indicates the first sidelink device that a resource in the second resource set is a resource that can be selected by the first sidelink device. The first sidelink device may use the resource in the second resource set as a part of candidate resources. The first sidelink device may select the resource in the second resource set to send data or control information, or may not select the resource in the second resource set. The second resource set recommended by the second sidelink device may be used as a reference for the first sidelink device to select a resource.

The information about the third resource set scheduled to the first sidelink device may be scheduled by the second sidelink device to the first sidelink device. A meaning of "scheduled" may be: The second sidelink device informs, notifies, or indicates the first sidelink device to send data or control information by using a resource in the third resource set. The first sidelink device directly uses the resource in the third resource set to send information, and the third resource set includes at least one resource. In this case, the first resource set is a subset of the third resource set, and the first resource set may be the same as the third resource set.

The information about the fourth resource set expected to be excluded by the first sidelink device may be expected by the second sidelink device to be excluded by the first sidelink device. A meaning of "expected to be excluded by the first sidelink device" may be: The second sidelink device does not recommend the first sidelink device to select a resource in the fourth resource set to send information. The first sidelink device may exclude some or all resources in the fourth resource set, or the first sidelink device may not exclude the resource in the fourth resource set. This depends on the first sidelink device.

The coordination parameter or the measurement result may be sent by the second sidelink device to the first sidelink device. The coordination parameter or the measurement result may include, for example, RSRP, a channel state information (CSI) feedback result, location information, power, a speed, a path loss, and a priority that are measured by the second sidelink device. The first sidelink device determines, by using the coordination parameter or the measurement result, whether to select a corresponding transmission resource or how to select a corresponding transmission resource.

The indication information indicating the first sidelink device to determine the first resource set may be indication information for resource retransmission or indication information for resource reselection. The indication information for resource reselection indicates that a resource previously reserved by the first sidelink device is reserved or occupied, and the first sidelink device can learn, based on the indication information for resource reselection, that the previously reserved resource cannot be used to send information and resource selection is to be performed again. The indication information for resource retransmission indicates that data or control information previously sent by the first sidelink device fails to be sent, and a resource is to be selected to resend the data or the control information. Therefore, the first sidelink device starts a resource selection process based on the indication information in the coordination information, and determines, in the resource selection process, the first resource set used to send information.

In Embodiment 1 of this application, the first sidelink device determines the content of the coordination information based on the first indication information. Therefore, signaling identification complexity can be reduced.

In an optional implementation, the first indication information can further indicate a sidelink device to which the first sidelink device may send data or control information on the first resource set determined based on the coordination information.

The second resource set and/or the third resource set may be used by the first sidelink device to send information to another sidelink device, and the first indication information may indicate the another sidelink device.

That the first indication information indicates that the coordination information includes the information about the second resource set recommended by the second sidelink device to the first sidelink device is used as an example. The first sidelink device determines, based on the first indication information, that the coordination information includes the information about the second resource set. The first sidelink device may select one or more resources in the second resource set as resources in the first resource set, and send data or control information on the one or more resources selected from the second resource set. Alternatively, the first sidelink device may not select the resource in the second resource set.

The first indication information may further indicate that the resource in the second resource set recommended by the second sidelink device is used by the first sidelink device to send information to the second sidelink device. In other words, the first indication information indicates that the resource selected by the first sidelink device from the second resource set may be used to send information to the second sidelink device.

Alternatively, the first indication information may further indicate that the resource in the second resource set recommended by the second sidelink device includes a resource used by the first sidelink device to send information to any other sidelink device. In other words, the first indication information indicates that the resource selected by the first sidelink device from the second resource set may be used to send information to any sidelink device.

Alternatively, the first indication information may further indicate that the resource in the second resource set recommended by the second sidelink device includes a resource used by the first sidelink device to send information to a sidelink device other than the second sidelink device. In other words, the first indication information indicates that the resource selected by the first sidelink device from the second resource set may be used to send information to the sidelink device other than the second sidelink device.

The foregoing is described by using the example in which the first indication information indicates that the coordination information includes the information about the second resource set recommended by the second sidelink device to the first sidelink device. When the first indication information indicates that the coordination information includes the information about the third resource set scheduled by the second sidelink device to the first sidelink device, the first indication information may further indicate a sidelink device to which the first sidelink device can send data or control information on the first resource set determined based on the coordination information. For example, the first indication information indicates that the third resource set is used by the first sidelink device to send information to the second sidelink device, or the first indication information indicates that the third resource set is used by the first sidelink device to send information to any sidelink device, or the first indication information indicates that the third resource set is used by the first sidelink device to send information to a sidelink device other than the second sidelink device.

In Embodiment 1 of this application, the first indication information may further indicate a sidelink device to which the second resource set and/or the third resource set may be used to send information. For example, when the first indication information indicates that the second resource set may be used to send information to the second sidelink device, but that the first sidelink device selects the first resource set is not to send information to the second sidelink device, the first sidelink device may not select a resource in the second resource set recommended by the second sidelink device. In this way, resource selection efficiency of the first sidelink device can be improved, and the coordination procedure can be optimized.

When the first indication information indicates that the coordination information includes the information about the fourth resource set expected by the second sidelink device to be excluded by the first sidelink device, the first indication information may further indicate a sidelink device to which the first sidelink device can send data or control information on the first resource set determined based on the coordination information. The fourth resource set is used by the first sidelink device to exclude some or all resources in the fourth resource set when determining the first resource set for sending information to another sidelink device, and the first indication information may indicate the another sidelink device. For example, the first indication information indicates that the first sidelink device is expected to exclude some or all resources in the fourth resource set when determining a resource for sending information to the second sidelink device, or the first indication information indicates that the first sidelink device is expected to exclude some or all resources in the fourth resource set when determining a resource for sending information to any sidelink device, or the first indication information indicates that the first sidelink device is expected to exclude some or all resources in the fourth resource set when determining a resource for sending information to a sidelink device other than the second sidelink device.

In Embodiment 1 of this application, the first indication information may further indicate a sidelink device, where the first sidelink device may exclude some or all resources in the fourth resource set when determining the first resource set for sending information to the sidelink device. For example, when the first indication information indicates that the first sidelink device selects the first resource set is to send information to the second sidelink device, some or all resources in the fourth resource set should be excluded. If the first sidelink device selects the first resource set to send information to the sidelink device other than the second sidelink device, the first sidelink device may not exclude a resource in the fourth resource set. In this way, resource selection efficiency of the first sidelink device can be improved, and the coordination procedure can be optimized.

The following uses Table 3 as an example to show a relationship between a value of the first indication information and indicated content. It may be understood that values of the indication information in Table 3 are merely examples. The first indication information may use another value, or the first indication information may be in another form.

TABLE 3

Table of a relationship between a value of the first indication information and indicated content

| Value of the first indication information | The first indication information indicates that the coordination information includes |
|---|---|
| 0000 | Information about the second resource set recommended by the second sidelink device to the first sidelink device, where the second resource set is used by the first sidelink device to send information to the second sidelink device |
| 0001 | Information about the second resource set recommended by the second sidelink device to the first sidelink device, where the second resource set is used by the first sidelink device to send information to any sidelink device |
| 0010 | Information about the second resource set recommended by the second sidelink device to the first sidelink device, where the second resource set is used by the first sidelink device to send information to the sidelink device other than the second sidelink device |
| 0011 | Information about the third resource set scheduled by the second sidelink device to the first sidelink device, where the third resource set is used by the first sidelink device to send information to the second sidelink device |
| 0100 | Information about the third resource set scheduled by the second sidelink device to the first sidelink device, where the third resource set is used by the first sidelink device to send information to any sidelink device |
| 0101 | Information about the third resource set scheduled by the second sidelink device to the first sidelink device, where the third resource set is used by the first sidelink device to send information to the sidelink device other than the second sidelink device |
| 0110 | Information about the fourth resource set expected by the second sidelink device to be excluded by the first sidelink device, where the first sidelink device excludes some or all resources in the fourth resource set when determining a resource for sending information to the second sidelink device |
| 0111 | Information about the fourth resource set expected by the second sidelink device to be excluded by the first sidelink device, where the first sidelink device excludes some or all resources in the fourth resource set when determining a resource for sending information to any sidelink device |
| 1000 | Information about the fourth resource set expected by the second sidelink device to be excluded by the first sidelink device, where the first sidelink device excludes some or all resources in the fourth resource set when determining a resource for sending information to the sidelink device other than the second sidelink device |
| 1001 | Coordination parameter or measurement result, where the first resource set determined based on the coordination parameter or the measurement result is used to send information to the second sidelink device |
| 1010 | Coordination parameter or measurement result, where the first resource set determined based on the coordination parameter or the measurement result is used to send information to any sidelink device |
| 1011 | Coordination parameter or measurement result, where the first resource set determined based on the coordination parameter or the measurement result is used to send information to the sidelink device other than the second sidelink device |
| 1100 | Indication information, where the indication information indicates the first sidelink device to determine the first resource set to send information to the second sidelink device |
| 1101 | Indication information, where the indication information indicates the first sidelink device to determine the first resource set to send information to any sidelink device |
| 1110 | Indication information, where the indication information indicates the first sidelink device to determine the first resource set to send information to the sidelink device other than the second sidelink device |

It may be understood that the content indicated by the first indication information is an example. In Embodiment 1 of this application, the first indication information may alternatively indicate some content in Table 3, or may be used to deform the content indicated in Table 3. For example, Table 4 is another table of a relationship between a value of the first indication information and indicated content. As shown in Table 4, some values of the first indication information may indicate a sidelink device to which a resource determined by the first sidelink device from the second resource set is used to send information, and some values indicate only that the content of the coordination information includes the information about the third resource set scheduled to the first sidelink device, and a sidelink device to which the third resource set is used to send information is not indicated.

TABLE 4

Table of the relationship between a value of the first indication information and indicated content

| Value of the first indication information | The first indication information indicates that the coordination information includes |
|---|---|
| 0000 | Information about the second resource set recommended by the second sidelink device to the first sidelink device, where the second resource set is used by the first sidelink device to send information to the second sidelink device |
| 0001 | Information about the second resource set recommended by the second sidelink device to the first sidelink device, where the second resource set is used by the first sidelink device to send information to any sidelink device |
| 0010 | Information about the second resource set recommended by the second sidelink device to the first sidelink device, where the second resource set is used by the first sidelink device to send information to the sidelink device other than the second sidelink device |
| 0011 | Information about the third resource set scheduled by the second sidelink device to the first sidelink device |
| 0110 | Information about the fourth resource set expected by the second sidelink device to be excluded by the first sidelink device |
| 1001 | Coordination parameter or measurement result |
| 1100 | Indication information |

In an optional implementation, second indication information may be further received, where the second indication information indicates a sidelink device to which the first sidelink device may send information on the first resource set determined based on the coordination information. In other words, in this case, the first indication information indicates the content of the coordination information, and the second indication information indicates the sidelink device to which the first sidelink device may send information on the first resource set determined based on the coordination information. A function of the second indication information is the same as a function of indicating, by the first indication information, the sidelink device to which the first sidelink device may send information on the first resource set. Details are not described herein again.

The following uses Table 5 as an example to show a relationship between a value of the first indication information, a value of the second indication information, and indicated content. It may be understood that values of the indication information in Table 5 are merely examples. The first indication information and the second indication information may use other values, or the first indication information and the second indication information may be in other forms.

TABLE 5

Table of the relationship between a value of the first indication information, a value of the second indication information, and indicated content

| Value of the first indication information | The first indication information indicates that the coordination information includes | Value of the second indication information | The second indication information indicates that the coordination information includes |
|---|---|---|---|
| 000 | Information about the second resource set recommended by the second sidelink device to the first sidelink device | 00 | Information about the second resource set that is used by the first sidelink device to send information to the second sidelink device |
| | | 01 | Information about the second resource set that is used by the first sidelink device to send information to any sidelink device |
| | | 10 | Information about the second resource set that is used by the first sidelink device to send information to the |

TABLE 5-continued

Table of the relationship between a value of the first indication information, a value of the second indication information, and indicated content

| Value of the first indication information | The first indication information indicates that the coordination information includes | Value of the second indication information | The second indication information indicates that the coordination information includes |
|---|---|---|---|
| | | | sidelink device other than the second sidelink device |
| 001 | Information about the third resource set scheduled by the second sidelink device to the first sidelink device | 00 | Information about the third resource set that is used by the first sidelink device to send information to the second sidelink device |
| | | 01 | Information about the third resource set that is used by the first sidelink device to send information to any sidelink device |
| | | 10 | Information about the third resource set that is used by the first sidelink device to send information to the sidelink device other than the second sidelink device |
| 010 | Information about the fourth resource set expected by the second sidelink device to be excluded by the first sidelink device | 00 | The first sidelink device excludes some or all resources in the fourth resource set when determining a resource for sending information to the second sidelink device |
| | | 01 | The first sidelink device excludes some or all resources in the fourth resource set when determining a resource for sending information to any sidelink device |
| | | 10 | The first sidelink device excludes some or all resources in the fourth resource set when determining a resource for sending information to the sidelink device other than the second sidelink device |
| 011 | Coordination parameter or measurement result | | |
| 100 | Indication information | | |

In Table 5, when the first indication information indicates that the content of the coordination information includes the information about the second resource set recommended by the second sidelink device to the first sidelink device, a value of the second indication information may indicate a sidelink device to which the first sidelink device sends information by using the information about the second resource set. When the first indication information indicates that the content of the coordination information includes the information about the third resource set scheduled by the second sidelink device to the first sidelink device, a value of the second indication information may indicate a sidelink device to which the first sidelink device sends information by using the information about the third resource set. When the first indication information indicates that the content of the coordination information includes the information about the fourth resource set expected by the second sidelink device to be excluded by the first sidelink device, a value of the second indication information may indicate a sidelink device, where the first sidelink device excludes some or all resources in the fourth resource set when determining a resource for sending information to the sidelink device. When the first indication information indicates that the coordination information includes the coordination parameter or the measurement result, and when the first indication information indicates that the coordination information includes the indication information, the second indication information may not indicate a sidelink device to which the first sidelink device sends information on the first resource set. It may be understood that this is merely an example. When the first indication information indicates that the coordination information includes any one of the information about the second resource set, the information about the third resource set, the information about the fourth resource set, the coordination parameter or the measurement result, or the indication information, the second indication information may be further used for indication or may not be used for indication.

When the first indication information indicates that the content of the coordination information includes the information about the second resource set or the information about the third resource set, and the first indication information or the second indication information further indicates that the second resource set and/or the third resource set are/is used to send information to the sidelink device other than the first sidelink device, the first indication information or the second indication information may further indicate whether the second resource set and/or the third resource set include/includes a reserved resource of the second sidelink device, where the reserved resource of the second sidelink device is a resource that is reserved by the second sidelink device and that is used to receive or send information. Alternatively, the first sidelink device may further receive third indication information, where the third indication information indicates whether the second resource set and/or the third resource set include/includes a reserved resource of the second sidelink device.

In Table 3 to Table 5 in Embodiment 1 of this application, different values of the first indication information and/or the second indication information indicate only one type of content included in the coordination information. For example, in Table 4, the value 0011 of the first indication information indicates that the coordination information includes the information about the third resource set, and the value 0110 of the first indication information indicates that the coordination information includes the information about the fourth resource set. In an optional implementation, a value of the first indication information may also indicate that the coordination information includes a plurality of pieces of content. For example, the value 0110 of the first indication information indicates that the coordination information includes the information about the fourth resource set expected by the second sidelink device to be excluded by the first sidelink device, and the first sidelink device excludes some or all resources in the fourth resource set when determining a resource for sending information to the sidelink device other than the second sidelink device; and the coordination information further includes the information about the third resource set scheduled by the second sidelink device to the first sidelink device, and the third resource set is used by the first sidelink device to send information to the sidelink device other than the second sidelink device. It may be understood that there are a plurality of such combination manners. This is not limited in Embodiment 1 of this application.

For different values of the first indication information, the second indication information, or the third indication information shown in Table 3 to Table 5, sizes of the coordination information may be different. The size of the coordination information is a quantity of bits occupied by the coordination information. In this case, all coordination information may be supplemented based on a maximum quantity of bits, for example, quantities of bits, of the coordination information, corresponding to different values of the first indication information, the second indication information, or the third indication information are set to be the same.

The following describes how the first sidelink device determines the first resource set based on the content of the coordination information.

In Embodiment 1 of this application, the second resource set is a resource set recommended to the first sidelink device, and may be used by the first sidelink device to select the first resource set from the second resource set. Optionally, the first sidelink device may determine the first resource set based on the second resource set and a fifth resource set, where the fifth resource set is a resource set determined by the first sidelink device through monitoring. The first sidelink device determines all candidate resources in a resource selection window as a candidate resource set, monitors SCI sent by another sidelink device in a monitoring time window, then excludes a reserved or occupied resource from the candidate resource set, and determines a remaining candidate resource set as the fifth resource set. For a process in which the first sidelink device determines the fifth resource set through monitoring, refer to the foregoing descriptions of "the process in which the terminal device selects the resource based on the monitoring result of the terminal device" in embodiments of this application. The first sidelink device determines the first resource set in the second resource set and the fifth resource set.

In this case, when the second resource set is recommended by the second sidelink device to the first sidelink device, and the first resource set determined by the first sidelink device is used to send information to the sidelink device other than the second sidelink device, or the first resource set determined by the first sidelink device is used to send information to any sidelink device, the first sidelink device may determine the first resource set in the following order:

The first sidelink device performs determining in an intersection set of the second resource set and the fifth resource set, and performs determining in the second resource set or the fifth resource set. In other words, the first sidelink device first selects a resource in the intersection set of the second resource set and the fifth resource set as a resource in the first resource set. If there is no intersection set of the second resource set and the fifth resource set, or the resource in the intersection set of the second resource set and the fifth resource set is insufficient to serve as a candidate resource set, a resource may be further selected from the second resource set or the fifth resource set. For example, the second resource set includes resources R1, R2, R3, and R4, the fifth resource set includes resources R1, R3, R5, and R7, and the intersection set of the second resource set and the fifth resource set is R1 and R3. Therefore, the first sidelink device first selects a resource in the first resource set from R1 and R3. If the resources in R1 and R3 are insufficient, the first sidelink device further performs selection from R2, R4, R5, and R7. It may be understood that the resource in the intersection set of the second resource set and the fifth resource set is a resource recommended, for use, by both the first sidelink device and the second sidelink device. Therefore, the first sidelink device may first performs selection in the intersection set of the second resource set and the fifth resource set, and determining of a sequence of the second resource set and the fifth resource set may be understood via FIG. 9.

For sidelink devices, if one sidelink device serving as a transmit end sends information to another sidelink device serving as a receive end, a link from the sidelink device serving as the transmit end to the sidelink device serving as the receive end is a transmission link. A sidelink device serving as a transmit end is an interference source for another sidelink device serving as a receive end. Therefore, a link from the sidelink device serving as the transmit end to the another sidelink device serving as the receive end is an interference link. Both the sidelink device serving as the transmit end and the sidelink device serving as the receive end may monitor the sidelink device serving as the transmit end. Therefore, a link from the sidelink device serving as the transmit end to a sidelink device performing monitoring is a monitoring link.

Figures 9, 10:
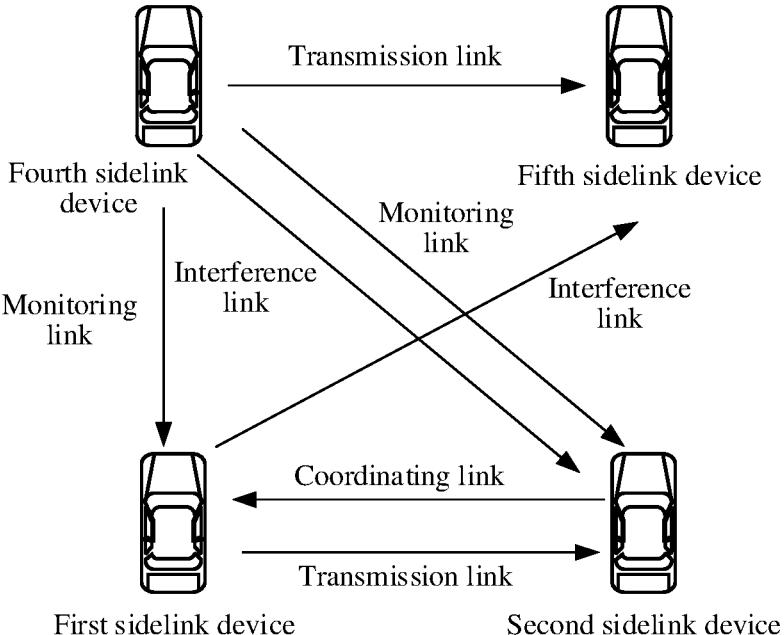
FIG. 9 is a schematic diagram in which a second sidelink device assists a first sidelink device in selecting a resource according to Embodiment 1 of this application.
FIG. 10 is another schematic diagram in which the second sidelink device assists the first sidelink device in selecting a resource according to Embodiment 1 of this application.

FIG. 9 is a schematic diagram in which the second sidelink device assists the first sidelink device in selecting a resource. As shown in FIG. 9, the second sidelink device sends coordination information to the first sidelink device, to assist the first sidelink device in selecting a resource. Therefore, a link from the second sidelink device to the first sidelink device is referred to as a coordination link. The first resource set determined by the first sidelink device is used to send information to the sidelink device other than the second sidelink device or any sidelink device. Therefore, a link from the first sidelink device to the sidelink device other than the second sidelink device or any sidelink device is referred to as a transmission link. A fourth sidelink device selects a resource to send information to a fifth sidelink device. Therefore, the fourth sidelink device may be considered as an interference source. When the sidelink device other than the second sidelink device or any sidelink device is a receiving device of the first sidelink device, an interference link from the fourth sidelink device to the second sidelink device does not overlap a monitoring link. Therefore, in this case, a monitoring result of the second sidelink device cannot completely reflect a real interference status. In addition, an interference link of the first sidelink device does not overlap a monitoring link, in other words, a monitoring result of the first sidelink device cannot accurately reflect a status of interference caused by the first sidelink device to another receiving device. Therefore, a feasibility degree of the second resource set recommended by the second sidelink device is similar to that of the fifth resource set monitored by the first sidelink device. In this case, the first sidelink device may preferentially use an intersection part of the second resource set and the fifth resource set, because this part of resources are jointly authenticated by the first sidelink device and the second sidelink device. If a quantity of resources in the intersection part is insufficient, a resource in the second resource set or the fifth resource set is used.

When the second resource set is recommended by the second sidelink device to the first sidelink device, and the first resource set determined by the first sidelink device is used to send information to the second sidelink device, the first sidelink device may determine the first resource set in the following order:

The first sidelink device performs determining in an intersection set of the second resource set and a fifth resource set, performs determining in the second resource set, and performs determining in the fifth resource set. In other words, the first sidelink device first selects a resource in the intersection set of the second resource set and the fifth resource set as a resource in the first resource set. If there is no intersection set of the second resource set and the fifth resource set, or the resource in the intersection set of the second resource set and the fifth resource set is insufficient to serve as a candidate resource set, a resource may be further selected from the second resource set. If the resource in the second resource set is still insufficient, a resource may be further selected from the fifth resource set. For example, the second resource set includes resources R1, R2, R3, and R4, the fifth resource set includes resources R1, R3, R5, and R7, and the intersection set of the second resource set and the fifth resource set is R1 and R3. Therefore, the first sidelink device first selects a resource in the first resource set from R1 and R3. If the resources in R1 and R3 are insufficient, the first sidelink device further performs selection from R2 and R4, and then performs selection from R5 and R7.

It may be understood that the resource in the intersection set of the second resource set and the fifth resource set is a resource recommended, for use, by both the first sidelink device and the second sidelink device. Therefore, the first sidelink device may first performs selection in the intersection set of the second resource set and the fifth resource set, and determining of a sequence of the second resource set and the fifth resource set may be understood via FIG. 10.

FIG. 10 is a schematic diagram in which the second sidelink device assists the first sidelink device in selecting a resource. As shown in FIG. 10, the second sidelink device sends coordination information to the first sidelink device, to assist the first sidelink device in selecting a resource. Therefore, a link from the second sidelink device to the first sidelink device is referred to as a coordination link. The first resource set determined by the first sidelink device is used to send information to the second sidelink device. Therefore, a link from the first sidelink device to the second sidelink device is referred to as a transmission link. A fourth sidelink device selects a resource to send information to a fifth sidelink device. Therefore, the fourth sidelink device may be considered as an interference source. An interference link from the fourth sidelink device to the second sidelink device overlaps a monitoring link. Therefore, in this case, a monitoring result of the second sidelink device can reflect a real interference status. However, an interference link of the first sidelink device does not overlap a monitoring link, in other words, a monitoring result of the first sidelink device cannot accurately reflect a status of interference caused by the first sidelink device to another receiving sidelink device. Therefore, the second resource set recommended by the second sidelink device may be considered as a more reliable resource than the fifth resource set monitored by the first sidelink device. In this case, a resource in the second resource set recommended by the second sidelink device may be preferentially selected.

Optionally, selection from the second resource set may also be classified into four manners:

Manner 1: The first sidelink device performs selection from the second resource set, and there is no priority sequence between resources in the second resource set.

Manner 2: The first sidelink device first performs selection from an intersection set of the second resource set and a candidate resource set of the first sidelink device, further performs selection from another resource in the second resource set if a resource is insufficient or no resource exists in the intersection set, and further performs selection from the fifth resource set if a resource is still insufficient and there is no resource.

Manner 3: The first sidelink device first performs selection from an intersection set of the second resource set and a candidate resource set of the first sidelink device, further performs selection from the fifth resource set if a resource is insufficient or no resource exists in the intersection set, and further performs selection from another resource in the second resource set if a resource is still insufficient and there is no resource.

Manner 4: The first sidelink device first performs selection from an intersection set of the second resource set and a candidate resource set of the first sidelink device, and further performs selection from the fifth resource set if a resource is insufficient or there is no resource in the intersection set.

The candidate resource set of the first sidelink device may be the set $S_A$ including all $M_{total}$ candidate resources in step (4) in the foregoing "process in which the terminal device selects the resource based on the monitoring result of the terminal device" in embodiments of this application.

In Embodiment 1 of this application, when the coordination information includes the information about the third resource set scheduled to the first sidelink device, the first sidelink device directly selects some or all resources in the third resource set as resources in the first resource set, to send information.

In an optional implementation, the second resource set may be a resource set recommended by the second sidelink device to the first sidelink device, and the third resource set may be a resource set scheduled by the second sidelink device to the first sidelink device. The second resource set and/or the third resource set may include one or more of the following resources: a resource selected by the second sidelink device based on a monitoring result of the second sidelink device, a resource selected by the second sidelink device from a preconfigured resource pool, and a resource determined by the second sidelink device according to an indication of a base station.

For the resource selected by the second sidelink device based on the monitoring result of the second sidelink device, the second sidelink device monitors a resource in a monitoring time window, excludes a reserved or occupied resource, selects a resource in a corresponding selection time window as a resource in the second resource set after excluding the corresponding resource, and recommends the resource to the first sidelink device. For this process, refer to the foregoing "process in which the terminal device selects the resource based on the monitoring result of the terminal device" in embodiments of this application. Optionally, the second sidelink device excludes, based on a priority, the reserved or occupied resource in the selection time window. The first resource set is used by the first sidelink device to send data to the second sidelink device, and the priority is a third priority. Alternatively, the first resource set is used by the first sidelink device to send data to any sidelink device, and the priority is a fourth priority. Alternatively, the first resource set is used by the first sidelink device to send data to the sidelink device other than the second sidelink device, and the priority is a fifth priority. A relationship between a value of the third priority, a value of the fourth priority, and a value of the fifth priority is: the value of the third priority≤the value of the fourth priority≤the value of the fifth priority.

It should be noted that, when the first resource set is used by the first sidelink device to send data to the second sidelink device, and the priority is the third priority, a condition that the third priority meets may be any one of the following: the value of the third priority≤the value of the fourth priority, the value of the third priority≤the value of the fifth priority, or the value of the third priority≤the value of the fourth priority≤the value of the fifth priority.

Similarly, when the first resource set is used by the first sidelink device to send data to any sidelink device, and the priority is the fourth priority, a condition that the fourth priority meets may be any one of the following: the value of the third priority≤the value of the fourth priority, the value of the fourth priority≤the value of the fifth priority, or the value of the third priority≤the value of the fourth priority≤the value of the fifth priority.

Similarly, when the first resource set is used by the first sidelink device to send data to the sidelink device other than the second sidelink device, and the priority is the fifth priority, a condition that the fifth priority meets may be any one of the following: the value of the third priority≤the value of the fifth priority, the value of the fourth priority≤the value of the fifth priority, or the value of the third priority≤the value of the fourth priority≤the value of the fifth priority.

In other words, "the value of the third priority≤the value of the fourth priority≤the value of the fifth priority" may represent a relationship between any two priorities of the three priorities, or a relationship between the three priorities. In other words, a meaning of "the value of the third priority≤the value of the fourth priority≤the value of the fifth priority" is: the value of the third priority≤the value of the fourth priority, or the value of the third priority≤the value of the fifth priority, or the value of the fourth priority≤the value of the fifth priority, or the value of the third priority≤the value of the fourth priority≤the value of the fifth priority.

A smaller value of the priority indicates more resources excluded based on the priority, less interference to a finally left resource, and better quality. Therefore, when the first resource set is used by the first sidelink device to send data to the second sidelink device, a resource selected by the second sidelink device is expected to have less interference, so that the value of the third priority is smaller. When the first resource set is used by the first sidelink device to send data to the sidelink device other than the second sidelink device, a requirement on an interference degree of a finally left resource is low. Therefore, the value of the fifth priority may be greater than the value of the third priority and the value of the fourth priority.

In Embodiment 1 of this application, the fourth resource set is used by the first sidelink device to select the first resource set from a sixth resource set. The sixth resource set is a resource set obtained by excluding some or all resources in the fourth resource set and/or a reserved resource from a candidate resource set. The reserved resource is a resource determined by the first sidelink device through autonomous monitoring (step (6) in the foregoing "process in which the terminal device selects the resource based on the monitoring result of the terminal device" in embodiments of this application) and/or a reserved resource determined based on a slot that is not monitored in a resource monitoring window (step (5) in the foregoing "process in which the terminal device selects the resource based on the monitoring result of the terminal device" in embodiments of this application). The candidate resource set may be the set $S_A$ including all $M_{total}$ candidate resources in step (4) in the foregoing "process in which the terminal device selects the resource based on the monitoring result of the terminal device" in embodiments of this application.

The first sidelink device monitors a resource in a monitoring time window, and may refer to, as a fifth resource set, a resource set obtained by excluding the reserved or occupied resource from the candidate resource set but not excluding the resource in the fourth resource set from the candidate resource set. When the coordination information received by the first sidelink device includes the fourth resource set expected by the second sidelink device to be excluded from the first sidelink device, the first sidelink device may exclude some or all resources in the fourth resource set when determining the fifth resource set, in other words, consider that some or all resources in the fourth resource set are also reserved or occupied resources and need to be excluded from the candidate resource set.

Figure 11:
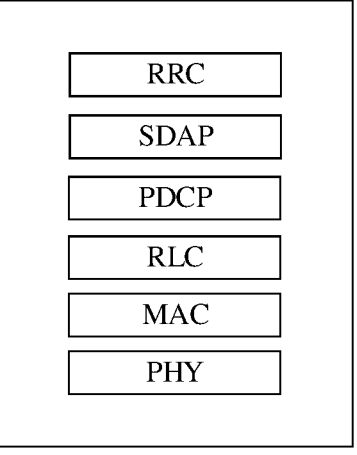
FIG. 11 is a schematic diagram of a control plane protocol stack structure of the first sidelink device according to Embodiment 1 of this application.

A resource set obtained by excluding the reserved or occupied resource and/or some or all resources in the fourth resource set from the candidate resource set may be referred to as the sixth resource set. The first sidelink device may select some or all resources in the first resource set from the sixth resource set. It may be understood that the fourth resource set is a resource set expected to be excluded by the first sidelink device. The first sidelink device may choose to exclude some or all resources in the fourth resource set from the candidate resource set, or may not exclude any resource in the fourth resource set. Finally, the first sidelink device may not exclude any resource in the fourth resource set from the candidate resource set. The first sidelink device may determine the first resource set in two manners:

Manner 1: The first sidelink device reports the sixth resource set to a higher layer of the first sidelink device, and the higher layer of the first sidelink device determines the first resource set in the sixth resource set. A structure of a control plane protocol stack of the first sidelink device may be shown in FIG. 11. From a bottom layer to a higher layer, the control plane protocol stack may be divided into a physical layer (PHY), a media access control (MAC) layer, a radio link control (RLC) layer, a packet data convergence protocol (PDCP) layer, a service data adaptation (SDAP) layer, and a radio resource control (RRC) layer. All layers other than the physical layer may be referred to as higher layers.

In the manner 1, the first sidelink device may determine, in the following manner, a resource, in the fourth resource set, that can be excluded from the candidate resource set:

In a case, a total quantity of resources in the candidate resource set is M, and a maximum value of a quantity of resources excluded from the fourth resource set may be determined in the following manners:

$M*(1-Y)$, where $Y \leq 1$, and a value of Y may be, for example, 0.5, 0.1, 0.15, 0.20, 0.35, 0.50, 0.7, 0.8, or another value;

$M*(1-YX)$, where X is a proportion of candidate resources that need to be ensured and that are reported to the higher layer (X in step (7)), $Y \geq 1$, and Y may be 5, 4, 3, 2, 2.5, 1.5, 1.75, or another value:

$M*(1-X)*Y$, where X is a proportion of candidate resources that need to be ensured and that are reported to the higher layer (X in step (7)), $Y \leq 1$, and a value of Y may be, for example, 0.5, 0.1, 0.15, 0.20, 0.35, 0.50, or another value.

In another case, each resource in the fourth resource set corresponds to one priority. Optionally, priorities of all resources in the fourth resource set may be different, or priorities of some resources may be the same, or priorities of all resources in the fourth resource set are the same. This is not limited in Embodiment 1 of this application. A priority corresponding to a resource in the fourth resource set may be referred to as a first priority, and a priority corresponding to a PSSCH and/or a PSCCH to be sent by the first sidelink device is referred to as a second priority. The first priority may be indicated by the coordination information. If the coordination information indicates that the first priority is not indicated, the first sidelink device may autonomously determine the first priority. The first sidelink device may calculate an RSRP measurement threshold based on the first priority and the second priority. It may be understood that because each resource in the fourth resource set corresponds to a priority, each resource in the fourth resource set corresponds to a threshold.

The first sidelink device receives the coordination information on a first resource. If reference signal received power on the first resource is greater than a threshold, a resource, in the fourth resource set, corresponding to the threshold is a resource that can be excluded. Therefore, a resource, in the fourth resource set, excluded by the first sidelink device from the fifth resource set may be a second resource, where the second resource corresponds to a first threshold, and the reference signal received power on the first resource is greater than the first threshold. It may be understood that the first threshold may have different values, and a threshold whose value is less than or equal to the reference signal received power on the first resource may be referred to as the first threshold.

For example, values of the priority may be 1 to 8, and a corresponding RSRP measurement threshold may be selected from $-\infty$ dBm, $-128$ dBm, $-128$ dBm, . . . , 0 dBm, $\infty$ dBm.

In an optional implementation, a total quantity of resources in the candidate resource set is M. If a quantity of second resources is greater than $M*(1-X\%)$, a threshold obtained through calculation based on the first priority and the second priority may be adjusted. For example, a specific value is added to the threshold obtained through calculation based on the first priority and the second priority, to enable the quantity of second resources to be less than or equal to $M*(1-X\%)$. For example, a value of X may be 20, 35, 50, or another value.

In the manner 1, the first sidelink device may adjust a quantity of excluded resources by adjusting the value of X or a value of the threshold, to ensure that a proper quantity of resources are used by the first sidelink device to select a resource in the first resource set.

Manner 2: The first sidelink device reports the fourth resource set and the fifth resource set to a higher layer of the first sidelink device, and the higher layer of the first sidelink device excludes some or all resources in the fourth resource set from the fifth resource set.

In the manner 2, an interfered resource can be eliminated to the greatest extent, and quality of a selected resource can be ensured.

In an optional implementation, the fourth resource set may be a resource set expected by the second sidelink device to be excluded by the first sidelink device, and the fourth resource set may include one or more of the following resources: a resource used by the second sidelink device to receive or send information, a reserved resource of the first sidelink device that is preempted by another sidelink device, a resource determined, by the second sidelink device based on a monitoring result of the second sidelink device, to be reserved by another sidelink device, a resource selected by the second sidelink device from a preconfigured resource pool, and a resource determined by the second sidelink device according to an indication of the base station.

For the reserved resource of the first sidelink device that is preempted by the another sidelink device, the first sidelink device reserves, based on a monitoring result of the first sidelink device or with assistance of another sidelink device, a resource for sending information. Before the first sidelink device sends information on the resource, the resource is preempted by the another sidelink device. The second sidelink device may assist the first sidelink device in performing preemption detection, use a detected preempted resource as a resource in the fourth resource set, send information about the fourth resource set to the first sidelink device by using coordination information, and expect the first sidelink device to exclude the resource.

In Embodiment 1 of this application, the first sidelink device receives the coordination information, and determines the content of the coordination information based on the first indication information, to reduce signaling identification complexity.

Embodiment 2

Embodiment 2 is another possible implementation of the communication method described in the solution 1. A difference between Embodiment 2 and Embodiment 1 lies in: In Embodiment 1, the first sidelink device receives the coordination information, where one or more of the information about the second resource set, the information about the third resource set, the information about the fourth resource set, the coordination parameter or the measurement result, and the indication information that are included in the coordination information are used to assist the first sidelink device in selecting a resource. In other words, the second resource set is recommended to the first sidelink device, the third resource set is scheduled to the first sidelink device, the fourth resource set is expected to be excluded by the first sidelink device, and both the coordination parameter or the measurement result and the indication information are used by the first sidelink device to select a resource. However, in Embodiment 2, coordination information is received by a third sidelink device. Content included in the coordination information is still used to assist a first sidelink device in selecting a resource, but the coordination information is received by the third sidelink device. In this case, although the coordination information is used to assist the first sidelink device in selecting a resource, the third sidelink device may still select a resource with reference to the coordination information. For example, when the content included in the coordination information is information about a second resource set recommended to the first sidelink device, information about a third resource set scheduled to the first sidelink device, or information about a fourth resource set expected to be excluded by the first sidelink device, any one of the three resource sets is an unavailable resource set for the third sidelink device. Therefore, the third sidelink device may exclude some or all resources in the second resource set, the third resource set, or the fourth resource set.

Therefore, in Embodiment 2, the content included in the coordination information, a method for determining the content of the coordination information, indication functions of first indication information, second indication information, and third indication information, and types of resources included in the second resource set, the third resource set, and the fourth resource set are the same as those described in Embodiment 1. A difference lies only in that the first sidelink device in Embodiment 1 and the third sidelink device in Embodiment 2 determine a finally selected resource based on the coordination information in different manners.

Figure 12:
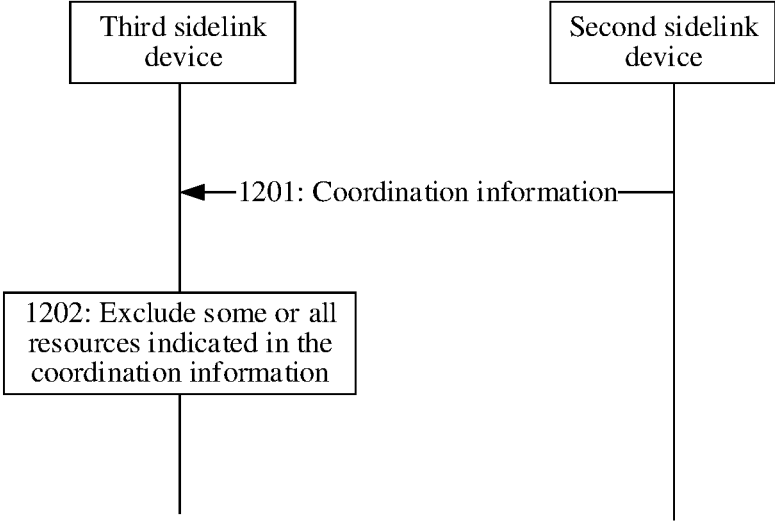
FIG. 12 is a flowchart of a communication method according to Embodiment 2 of this application.

Therefore, in Embodiment 2, only a part different from that in Embodiment 1 is described, and a same part is not described again. FIG. 12 is a flowchart of a communication method according to Embodiment 2 of this application. The method includes the following steps.

1201: The third sidelink device receives the coordination information from a second sidelink device.

In step 1201, the coordination information received by the third sidelink device includes one or more of the following content: the information about the second resource set recommended by the second sidelink device to the first sidelink device, the information about the third resource set scheduled by the second sidelink device to the first sidelink device, or the information about the fourth resource set expected by the second sidelink device to be excluded by the first sidelink device.

1202: The third sidelink device excludes some or all resources indicated in the coordination information.

Different from Embodiment 1, after receiving the coordination information, the third sidelink device excludes some or all resources indicated in the coordination information. The third sidelink device may perform monitoring in a monitoring time window, exclude, based on a monitoring result, a reserved or occupied resource from a candidate resource set corresponding to a selection time window, and select a resource from a remaining candidate resource to send information. When the third sidelink device receives the coordination information, and determines that the coordination information includes the information about the second resource set recommended to the first sidelink device, the information about the third resource set scheduled to the first sidelink device, or the information about the fourth resource set expected to be excluded by the first sidelink device, the third sidelink device excludes some or all resources in the second resource set, the third resource set, or the fourth resource set from the candidate resource determined through monitoring. For example, the second resource set includes resources R1, R2, R3, and R4, the third resource set includes a resource R5, the fourth resource set includes R6, candidate resources determined by the third sidelink device through monitoring include R3, R4, R5, R6, R7, and R8, and the third sidelink device may exclude R3, R4, R5, and R6, or exclude one or more of R3, R4, R5, and R6.

In Embodiment 2 of this application, for a method in which the third sidelink device excludes some or all resources in the second resource set, the third resource set, and the fourth resource set from the candidate resources, refer to the method in which the first sidelink device excludes some or all resources in the fourth resource set from the fifth resource set in Embodiment 1. Details are not described herein again.

In Embodiment 2 of this application, the third sidelink device receives the coordination information, where the coordination information includes one or more of the information about the second resource set recommended to the first sidelink device, the information about the third resource set scheduled to the first sidelink device, or the information about the fourth resource set expected to be excluded by the first sidelink device. The third sidelink device may exclude some or all resources in the second resource set, the third resource set, and the fourth resource set, to improve resource selection efficiency of the third sidelink device.

Embodiment 3

Figures 13, 14:
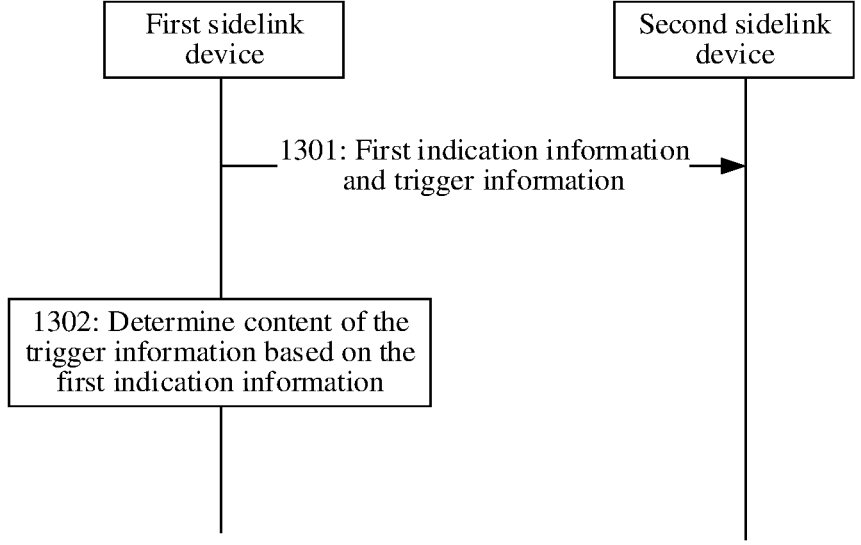
FIG. 13 is a flowchart of a communication method according to Embodiment 3 of this application.
FIG. 14 is a schematic diagram structural of a communication apparatus according to an embodiment of this application.

Embodiment 3 is a possible implementation of the communication method described in the solution 2. FIG. 13 is a flowchart of a communication method according to Embodiment 3 of this application. As shown in FIG. 13, the method includes the following steps.

1301: A second sidelink device receives first indication information and trigger information from a first sidelink device.

Similar to Embodiment 1, in Embodiment 3 of this application, a sidelink transmission technology is used as an example. In a sidelink transmission scenario, the first sidelink device and the second sidelink device may be devices of a same type. For example, the first sidelink device and the second sidelink device may be terminal devices. In an example in which both the first sidelink device and the second sidelink device are terminal devices, the first sidelink device may be an OBU and the second sidelink device may be a terminal-type RSU, or the first sidelink device is a terminal-type RSU and the second sidelink device is an OBU. Alternatively, the first sidelink device and the second sidelink device may be network devices.

The first sidelink device sends the trigger information to the second sidelink device. The second sidelink device triggers a coordination procedure after receiving the trigger information, assists the first sidelink device in selecting a resource, and sends coordination information to the first sidelink device.

The trigger information in Embodiment 3 of this application may be the coordination information in step 301 in FIG. 3, and the trigger information is used to trigger the coordination procedure.

Locations for carrying the first indication information and the trigger information are similar to those in Embodiment 1, and details are not described herein again.

1302: The second sidelink device determines content of the trigger information based on the first indication information.

The second sidelink device may determine, based on the first indication information, that the trigger information includes one or more of the following content: third indication information used to identify the trigger information, second indication information indicating content of the coordination information, and a trigger parameter used by the second sidelink device to determine the coordination information. The third indication information may be 1 bit. A function of the third indication information is to indicate, to the second sidelink device, that current information is the trigger information, and the second sidelink device triggers the coordination procedure after identifying the trigger information. The second indication information indicates, to the second sidelink device, content that is to be included in the coordination information sent by the second sidelink device to the first sidelink device.

In an optional implementation, a function of the second indication information in Embodiment 3 of this application may be the same as functions of the first indication information, the second indication information, and the third indication information in Embodiment 1 of this application, in other words, the second indication information in Embodiment 3 of this application may indicate, to the second sidelink device, that the coordination information sent by the second sidelink device is to include one or more of information about a second resource set recommended to the first sidelink device, information about a third resource set scheduled to the first sidelink device, information about a fourth resource set expected to be excluded by the first sidelink device, a coordination parameter or a measurement result, or indication information used by the first sidelink device to determine a first resource set. The first resource set is used by the first sidelink device to send information on the first resource set.

Further, the second indication information in Embodiment 3 of this application indicates that the coordination information includes the information about the second resource set recommended by the second sidelink device to the first sidelink device. The second indication information in Embodiment 3 of this application may further indicate, to the second sidelink device, that the second resource set recommended by the second sidelink device is to include one or more of the following resources:

a resource used by the first sidelink device to send information to the second sidelink device, a resource used by the first sidelink device to send information to a sidelink device other than the second sidelink device, or a resource used by the first sidelink device to send information to any sidelink device. In other words, which one of the foregoing resources is to be recommended by the second sidelink device to the first sidelink device may also be indicated by the second indication information.

Further indication of the information about the third resource set, the information about the fourth resource set, the coordination parameter or the measurement result, and the indication information is similar to that in Embodiment 1, and is not described herein again.

In an optional implementation, the coordination parameter trigger parameter may include one or more of the following information: a quantity of sub-channels, a size of a selection window, a size of a monitoring window, a periodicity, or priority information.

Table 6 is a table of a relationship between a value of the first indication information and indicated content in Embodiment 3 of this application. It may be understood that values of the indication information in Table 6 are merely examples. The first indication information may use another value, or the first indication information may be in another form.

TABLE 6

| Table of the relationship between a value of the first indication information and indicated content | |
|---|---|
| Value of the first indication information | The first indication information indicates that the coordination information includes |
| 000 | Third indication information |
| 001 | Second indication information |
| 001 | Trigger parameter |
| 011 | Third indication information and second indication information |
| 010 | Third indication information and trigger parameter |
| 101 | Second indication information and trigger parameter |
| 110 | Third indication information, second indication information, and trigger parameter |

Embodiment 1 and Embodiment 3 of this application may be combined as a technical solution. One sidelink device receives first information from another sidelink device. The first information may be trigger information or may be coordination information. The sidelink device that receives the first information may indicate the first information by using one piece of indication information. The sidelink device that receives the first information can determine, based on the indication information, whether the first information is the trigger information or the coordination information, and may further determine content of the trigger information or the coordination information. For example, in Table 3 in Embodiment 1 of this application, 15 values of the first indication information are provided as examples, and each value represents different content included in different coordination information. In the solution combining Embodiment 1 and Embodiment 3, a plurality of values may be further added to the first indication information to indicate content included in the trigger information. For example, the first indication information has 22 values. When a value of the first indication information is one of the first 15 values, it indicates that the first information is the coordination information, and content included in the coordination information can be further learned of based on the first indication information. When a value of the first indication information is one of the last seven values in the 22 values, it indicates that the first information is the trigger information, and content included in the trigger information can be learned of based on the first indication information.

The communication methods in embodiments of this application are described above, and communication apparatuses in embodiments of this application are described below. For example, the apparatus may perform the method shown in Embodiment 1, Embodiment 2, and Embodiment 3. The method and the apparatus are based on a same technical concept. The method and the apparatus have similar principles for resolving problems. Therefore, for implementations of the apparatus and the method, refer to each other, and details of repeated parts are not described again.

An embodiment of this application provides a communication apparatus. A transceiver module is configured to receive coordination information, where the coordination information is used by a first sidelink device to determine a first resource set based on the coordination information, and the first resource set is used by the first sidelink device to send information on the first resource set. A processing module is configured to determine that the coordination information includes one or more of the following information: information about a second resource set recommended to the first sidelink device, information about a third resource set scheduled to the first sidelink device, information about a fourth resource set expected to be excluded by the first sidelink device, a coordination parameter or a measurement result used by the first sidelink device to determine the first resource set, and indication information indicating the first sidelink device to determine the first resource set.

In this embodiment of this application, a sidelink device that receives the coordination information can identify content of the coordination information, and therefore can perform a coordination procedure based on the identified content of the coordination information, to optimize the coordination procedure.

An embodiment of this application further provides a communication apparatus. The communication apparatus may be a second sidelink device, including: a processing module, configured to determine coordination information, where the coordination information is used by a first sidelink device to select a first resource set based on the coordination information, the first resource set is used by the first sidelink device to send information on the first resource set, and the coordination information includes one or more of the following information: information about a second resource set recommended to the first sidelink device, information about a third resource set scheduled to the first sidelink device, information about a fourth resource set expected to be excluded by the first sidelink device, a coordination parameter or a measurement result used by the first sidelink device to determine the first resource set, and indication information indicating the first sidelink device to determine the first resource set.

In this embodiment of this application, the second sidelink device sends the coordination information. A sidelink device that receives the coordination information can identify content of the coordination information, and therefore can perform a coordination procedure based on the identified content of the coordination information, to optimize the coordination procedure.

An embodiment of this application further provides a communication apparatus. The communication apparatus may be a second sidelink device, including: a transceiver module, configured to receive first indication information and trigger information, where the trigger information is used to trigger a coordination procedure; and a processing module, configured to indicate, based on the first indication information, that the trigger information includes one or more of the following information: third indication information used to identify the trigger information, second indication information indicating content of coordination information, and a trigger parameter used by the second sidelink device to determine the coordination information. The third indication information may be 1 bit. A function of the third indication information is to indicate, to the second sidelink device, that current information is the trigger information, and the second sidelink device triggers the coordination procedure after identifying the trigger information. The second indication information indicates, to the second sidelink device, content that is to be included in the coordination information sent by the second sidelink device to a first sidelink device.

In this embodiment of this application, the first indication information indicates content of the trigger information, to reduce signaling identification complexity and optimize the coordination procedure.

An embodiment of this application further provides a communication apparatus. The communication apparatus may be a first sidelink device, including: a processing module, configured to determine first indication information and trigger information, where the trigger information is used to trigger a coordination procedure, and the first indication information indicates that the trigger information includes one or more of the following information: third indication information used to identify the trigger information, second indication information indicating content of coordination information, and a trigger parameter used by a second sidelink device to determine the coordination information; and a transceiver module, configured to send the first indication information and the trigger information. The third indication information may be 1 bit. A function of the third indication information is to indicate that current information is the trigger information. The second indication information indicates content that is to be included in the coordination information sent to the first sidelink device.

In this embodiment of this application, the first indication information indicates content of the trigger information, to reduce signaling identification complexity and optimize the coordination procedure.

FIG. 14 is a simplified schematic structural diagram of a communication apparatus. As shown in FIG. 14, the communication apparatus may be a terminal device. In this embodiment of this application, both a first sidelink device and a second sidelink device may be terminal devices. The terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send radio frequency signals in a form of an electromagnetic wave. The input/output apparatus, for example, a touchscreen, a display, or a keyboard, is mainly configured to: receive data input by a user and output data to the user. It should be noted that some types of terminal devices may have no input/output apparatus.

When data is to be sent, the processor performs baseband processing on the to-be-sent data, and outputs a baseband signal to the radio frequency circuit. After performing radio frequency processing on the baseband signal, the radio frequency circuit sends a radio frequency signal in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data and processes the data. For ease of description, FIG. 14 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have sending and receiving functions may be considered as a transceiver module of the terminal device, and the processor that has a processing function may be considered as a processing module of the terminal device. As shown in FIG. 14, the terminal device includes a transceiver module 1401 and a processing module 1402. The transceiver module may also be referred to as a transceiver, a transceiver machine, a transceiver apparatus, or the like. The processing module may also be referred to as a processor, a processing board, a processing apparatus, or the like. Optionally, a component for implementing a receiving function in the transceiver module 1401 may be considered as a receiving module, and a component for implementing a sending function in the transceiver module 1401 may be considered as a sending module. That is, the transceiver module 1401 includes the receiving module and the sending module. The transceiver module may also be sometimes referred to as a transceiver machine, a transceiver, a transceiver circuit, or the like. The receiving module may also be sometimes referred to as a receiving machine, a receiver, a receiving circuit, or the like. The sending module may also be sometimes referred to as a transmitting machine, a transmitter, a transmitting circuit, or the like.

It should be understood that the transceiver module 1401 is configured to perform a sending operation and a receiving operation of the terminal device in the foregoing method embodiments, and the processing module 1402 is configured to perform an operation other than the sending operation and the receiving operation of the terminal device in the foregoing method embodiments. In this embodiment of this application, both the first sidelink device and the second sidelink device may be terminal devices.

When the communication apparatus is a chip apparatus or circuit, the chip apparatus may include a transceiver module and a processing module. The transceiver module may be an input/output circuit and/or a communication interface. The processing module is an integrated processor or microprocessor, or an integrated circuit on the chip.

Figure 15:
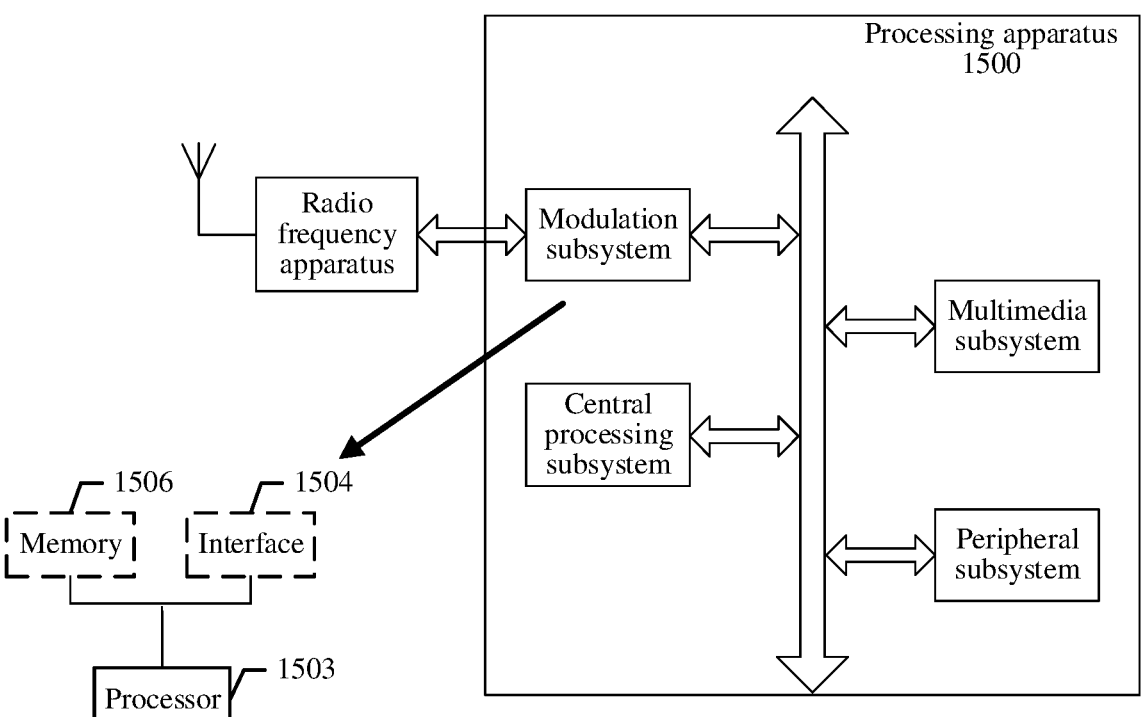
FIG. 15 is another schematic structural diagram of a communication apparatus according to an embodiment of this application.

FIG. 15 shows another form of this embodiment. A processing apparatus 1500 includes modules such as a modulation subsystem, a central processing subsystem, and a peripheral subsystem. The communication apparatus in this embodiment may be used as the modulation subsystem.

In some embodiments, the modulation subsystem may include a processor 1503 and an interface 1504. The processor 1503 completes a function of the foregoing processing module, and the interface 1504 completes a function of the foregoing transceiver module. In another variant, the modulation subsystem includes a memory 1506, a processor 1503, and a program that is stored in the memory 1506 and that can be run on the processor. When executing the program, the processor 1503 implements the method on a terminal device side in the foregoing method embodiments. It should be noted that the memory 1506 may be nonvolatile or volatile. The memory 1506 may be located in the modulation subsystem, or may be located in the processing apparatus 1500, provided that the memory 1506 can be connected to the processor 1503.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving coordination information, wherein the coordination information is used by a first sidelink device to determine a first resource set, and the first resource set is used by the first sidelink device to send sidelink information;
receiving first indication information; and
determining, based on the first indication information, that the coordination information comprises one or more of:
information about a second resource set recommended to the first sidelink device;
information about a third resource set scheduled to the first sidelink device;
information about a fourth resource set expected to be excluded by the first sidelink device;
a coordination parameter or a measurement result, wherein the coordination parameter or the measurement result is used by the first sidelink device to determine the first resource set; or
second indication information, wherein the second indication information indicates the first sidelink device to determine the first resource set,
wherein
the coordination information is determined as comprising the information about the second resource set recommended by a second sidelink device to the first sidelink device;
the first resource set is used by the first sidelink device to send sidelink information to a third sidelink device other than the second sidelink device on the first resource set; and
the communication method further comprises:
determining an intersection set of the second resource set and a fifth resource set, wherein the fifth resource set is a resource set determined by the first sidelink device through monitoring.

2. The communication method according to claim 1, wherein the fourth resource set is used by the first sidelink device to exclude some or all resources in the fourth resource set in response to the first sidelink device determining the first resource set for sending information to another sidelink device.

3. The communication method according to claim 1, wherein the coordination information is determined as comprising the information about the fourth resource set expected by the second sidelink device to be excluded by the first sidelink device; and the communication method further comprises:

reporting, by the first sidelink device, a sixth resource set to a higher layer of the first sidelink device, wherein the sixth resource set is a resource set obtained by the first sidelink device by excluding some or all resources in at least one of the fourth resource set or a reserved resource, and the reserved resource is a resource determined by the first sidelink device through autonomous monitoring.

4. The communication method according to claim 1, wherein the coordination information comprises the information about the third resource set scheduled to the first sidelink device, and the first sidelink device selects some or all resources in the third resource set as resources in the first resource set, to send sidelink information.

5. The communication method according to claim 1, wherein the first indication information and the coordination information are carried in sidelink control information (SCI).

6. A communication method, comprising:

receiving first indication information and trigger information, wherein the trigger information is used to trigger a coordination procedure, and the first indication information comprises a bitmap or field value that explicitly maps to a type of information included in the trigger information; and indicating, based on the first indication information, that the trigger information comprises one or more of:

second indication information, wherein the second indication information indicates content of coordination information;

third indication information, wherein the third indication information is used to identify the trigger information; or a trigger parameter, wherein the trigger parameter is used by a second sidelink device to determine the coordination information, wherein the indicating comprises decoding the first indication information to identify whether the trigger information contains the second indication information, the third indication information, or the trigger parameter.

7. The communication method according to claim 6, wherein the content of the coordination information comprises one or more of:

information about a second resource set recommended to a first sidelink device;

information about a third resource set scheduled to the first sidelink device;

information about a fourth resource set expected to be excluded by the first sidelink device;

a coordination parameter or a measurement result, wherein the coordination parameter or the measurement result is used by the first sidelink device to determine a first resource set; or fourth indication information, wherein the fourth indication information indicates the first sidelink device to determine the first resource set, wherein the first resource set is used by the first sidelink device to send sidelink information on the first resource set.

8. The communication method according to claim 6, wherein the trigger parameter comprises at least one of a quantity of sub-channels, a size of a selection window, a size of a monitoring window, a periodicity, or priority information.

9. A communication apparatus, comprising:

a processor; and a memory having instructions stored thereon that, when executed by the processor, cause the communication apparatus to:

receive coordination information, wherein the coordination information is used by a first sidelink device to determine a first resource set, and the first resource set is used by the first sidelink device to send sidelink information;

receive first indication information; and determine, based on the first indication information, that the coordination information comprises one or more of:

information about a second resource set recommended to the first sidelink device;

information about a third resource set scheduled to the first sidelink device;

information about a fourth resource set expected to be excluded by the first sidelink device;

a coordination parameter or a measurement result, wherein the coordination parameter or the measurement result is used by the first sidelink device to determine the first resource set; or second indication information, wherein the second indication information indicates the first sidelink device to determine the first resource set, wherein the coordination information is determined as comprising the information about the second resource set recommended by a second sidelink device to the first sidelink device;

the first resource set is used by the first sidelink device to send sidelink information to a third sidelink device other than the second sidelink device on the first resource set; and the communication apparatus is further caused to:

determine an intersection set of the second resource set and a fifth resource set, wherein the fifth resource set is a resource set determined by the first sidelink device through monitoring.

10. The communication apparatus according to claim 9, wherein the fourth resource set is used by the first sidelink device to exclude some or all resources in the fourth resource set in response to the first sidelink device determining the first resource set for sending information to another sidelink device.

11. The communication apparatus according to claim 9, wherein the coordination information is determined as comprising the information about the fourth resource set expected by the second sidelink device to be excluded by the first sidelink device; and the communication apparatus is further caused to:

report a sixth resource set to a higher layer of the first sidelink device, wherein the sixth resource set is a resource set obtained by the first sidelink device by excluding some or all resources in at least one of the fourth resource set or a reserved resource, and the reserved resource is a resource determined by the first sidelink device through autonomous monitoring.

12. The communication apparatus according to claim 9, wherein the coordination information comprises the information about the third resource set scheduled to the first sidelink device, and the first sidelink device selects some or all resources in the third resource set as resources in the first resource set, to send sidelink information.

13. The communication apparatus according to claim 9, wherein the first indication information and the coordination information are carried in sidelink control information (SCI).

14. A communication apparatus, comprising:

a processor; and a memory having instructions stored thereon that, when executed by the processor, cause the communication apparatus to:

receive first indication information and trigger information, wherein the trigger information is used to trigger a coordination procedure, and the first indication information comprises a bitmap or field value that explicitly maps to a type of information included in the trigger information; and indicate, based on the first indication information, that the trigger information comprises one or more of:

second indication information, wherein the second indication information indicates content of coordination information;

third indication information, wherein the third indication information is used to identify the trigger information; or a trigger parameter, wherein the trigger parameter is used by a second sidelink device to determine the coordination information, wherein the indicating comprises decoding the first indication information to identify whether the trigger information contains the second indication information, the third indication information, or the trigger parameter.

15. The communication apparatus according to claim 14, wherein the content of the coordination information comprises one or more of:

information about a second resource set recommended to a first sidelink device;

information about a third resource set scheduled to the first sidelink device;

information about a fourth resource set expected to be excluded by the first sidelink device;

a coordination parameter or a measurement result, wherein the coordination parameter or the measurement result is used by the first sidelink device to determine a first resource set; or fourth indication information, wherein the fourth indication information indicates the first sidelink device to determine the first resource set, wherein the first resource set is used by the first sidelink device to send sidelink information on the first resource set.

16. The communication apparatus according to claim 14, wherein the trigger parameter comprises at least one of a quantity of sub-channels, a size of a selection window, a size of a monitoring window, a periodicity, or priority information.

* * * * *